United States Patent
Mody

(10) Patent No.: US 12,180,362 B1
(45) Date of Patent: *Dec. 31, 2024

(54) LIQUID BINDER COMPOSITIONS AND USES THEREOF

(71) Applicant: ACS Technical Products, Inc., Griffith, IN (US)

(72) Inventor: Kamlesh Mody, Oak Brook, IL (US)

(73) Assignee: ACS Technical Products, Inc., Griffith, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,072

(22) Filed: Mar. 20, 2024

Related U.S. Application Data

(63) Continuation-in-part of application No. 18/213,308, filed on Jun. 23, 2023, now Pat. No. 11,965,087.

(51) Int. Cl.
| | | |
|---|---|---|
| *C08G 59/34* | (2006.01) | |
| *C08G 59/40* | (2006.01) | |
| *C08G 59/42* | (2006.01) | |
| *C08J 5/24* | (2006.01) | |
| *C08L 23/06* | (2006.01) | |
| *C08L 25/14* | (2006.01) | |
| *C08L 63/00* | (2006.01) | |
| *C08L 63/10* | (2006.01) | |
| *C08L 67/06* | (2006.01) | |
| *C08L 91/00* | (2006.01) | |
| *C08L 95/00* | (2006.01) | |
| *C09D 4/06* | (2006.01) | |
| *C09D 167/06* | (2006.01) | |
| *C09D 191/00* | (2006.01) | |
| *C09J 4/06* | (2006.01) | |
| *C09J 167/06* | (2006.01) | |
| *C09J 191/00* | (2006.01) | |

(52) U.S. Cl.
CPC ............ *C08L 67/06* (2013.01); *C08J 5/243* (2021.05); *C08J 5/244* (2021.05); *C08J 5/249* (2021.05); *C08L 23/06* (2013.01); *C08L 25/14* (2013.01); *C08L 91/00* (2013.01); *C08L 95/00* (2013.01); *C09D 4/06* (2013.01); *C09D 167/06* (2013.01); *C09D 191/00* (2013.01); *C09J 4/06* (2013.01); *C09J 167/06* (2013.01); *C09J 191/00* (2013.01); *C08J 2367/06* (2013.01); *C08J 2491/00* (2013.01); *C08L 2205/025* (2013.01); *C08L 2205/03* (2013.01); *C08L 2207/324* (2013.01)

(58) Field of Classification Search
None
See application file for complete search history.

(56) References Cited

U.S. PATENT DOCUMENTS

| | | | |
|---|---|---|---|
| 2,882,256 | A | 4/1959 | Waychoff et al. |
| 3,516,955 | A * | 6/1970 | Taft ............... C08G 63/6828 |
| | | | 525/34 |
| 4,411,955 | A | 10/1983 | Mondt et al. |
| 4,542,192 | A | 9/1985 | Kraft et al. |
| 4,777,230 | A | 10/1988 | Kamath |
| 4,933,420 | A | 6/1990 | Pham et al. |
| 6,838,515 | B2 | 1/2005 | Derks et al. |
| 7,326,752 | B2 | 2/2008 | McAlvin et al. |
| 7,396,882 | B2 | 7/2008 | Hewitt et al. |
| 9,199,415 | B2 | 12/2015 | Toncelli |
| 10,513,566 | B2 | 12/2019 | Mody et al. |
| 11,965,087 | B1 * | 4/2024 | Mody ............... C09D 5/02 |
| 2010/0048772 | A1 | 2/2010 | Moore et al. |
| 2018/0371118 | A1 | 12/2018 | Mody et al. |

FOREIGN PATENT DOCUMENTS

| | | | |
|---|---|---|---|
| CN | 101462955 A | 6/2009 | |
| EP | 0600546 B1 | 4/1999 | |
| EP | 2094794 B1 | 6/2010 | |
| WO | 2006078456 A2 | 7/2006 | |
| WO | WO-2016091773 A1 * | 6/2016 | ............ C08G 59/50 |

OTHER PUBLICATIONS

Lu et al., "The feasibility of using several soybean oil-based derivatives for asphalt binder modification: A preliminary study," Construction and Building Materials, 2023, vol. 391, No. 131735, 13 pages.
Cao et al. "Control of shrinkage and residual styrene of unsaturated polyester resins cured at low temperatures: I. Effect of curing agents," Polymer, vol. 44, 2003; pp. 1893-1902.
"Styrene CAS No. 100-42-5", Report on Carcinogens, Fourteenth Edition, 9 pages.
Abdel-Azim et al., "Unsaturated Polyester for Large Castings", Polymer Journal, vol. 26, No. 4, 1994; pp. 423-429.
Chatterjee et al., "Advances in chemistry and composition of softmaterials for drug releasing contact lenses", RSC Adv., vol. 10, 2020; 27 pages.
Holser, "Transesterification of epoxidized soybean oilto prepare epoxy methyl esters", Industrial Crops and Products, vol. 27, 2008; pp. 130-132.
Knothe et al., "Fatty Acid Alkyl Esters as Solvents: Evaluation of the Kauri-Butanol", ACS Publications, Ind. Eng. Chem. Res., vol. 50, 2011; pp. 4177-4182.Value. Comparison to Hydrocarbons, Dimethyl Diesters, and OtherOxygenates.
Lisyukov et al., "Producing sustainable unsaturated polyesterfor fiberglass application", AIP Conference Proceedings 2124, 2019; 5 pages.

(Continued)

*Primary Examiner* — Michael J Feely
(74) *Attorney, Agent, or Firm* — Stites & Harbison PLLC

(57) ABSTRACT

A binder composition includes an epoxidized vegetable oil or a derivative thereof having an epoxy group content of 1 to 12 weight percent, based on the total weight of the epoxidized vegetable oil; a carboxyl-functionalized resin; and a liquid reactive diluent. A combined acid value of the carboxyl-functionalized resin and the liquid reactive diluent is 50 to 500. Uses of the binder composition, for example in composites, coatings, elastomer formulations, and adhesives are also disclosed.

23 Claims, No Drawings

(56) References Cited

OTHER PUBLICATIONS

Miyagawa et al., "Development of Biobased Unsaturated Polyester Containing Functionalized Linseed Oil", Ind. Eng. Chem. Res., vol. 45, 2006; pp. 1014-1018.

Mustapha et al., "Interactions and performance analysis of epoxidized palm oil/unsaturated polyester resin: Mechanical, thermal, and thermo-mechanical properties", Polymers and Polymer Composites, vol. 30; pp. 1-10.

Nasirtabrizi et al., "Synthesis and chemical modification of maleic anhydride copolymers with phthalimide groups", International Journal of Industrial Chemistry, vol. 4, No. 11, 2013; 8 pages.

Riley et al., "Chemical Characterization and Physical Properties of Solvents", J. Am. Oil Chem. Soc., vol. 92, 2015; pp. 589-601. Derived from Epoxidized Methyl Soyate.

Sahin et al., "Cross-Linkable Epoxidized Maleinated Castor Oil:A Renewable Resin Alternative to Unsaturated Polyesters", International Journal of Polymer Science, vol. 2016; 7 pages.

Tawfik, "Effect of chemical Structures of saturated Polyester Coatings on their physical, chemical and mechanical Properties", National Research Centre Polymers and Pigments Department, 10 pages.

Worzakowska, "Thermal and viscoelastic properties of novel epoxydicyclopentadiene-terminated polyesters-styrene copolymers", J. Therm. Anal. Calorim, vol. 109, 2012; pp. 657-662.

Wu et al., "A Review on Styrene Substitutes in Thermosets andTheir Composites", Polymers, vol. 11, No. 1815, 2019; 20 pages.

John et al., "Fatty Acid-Based Monomers as Styrene Replacements for Liquid Molding Resins", reprint from Polymer, vol. 45, Oct. 2004, pp. 7729-7737.

\* cited by examiner

LIQUID BINDER COMPOSITIONS AND USES THEREOF

CROSS REFERENCE TO RELATED APPLICATION

This application is a continuation-in-part of U.S. patent application Ser. No. 18/213,308, filed on Jun. 23, 2023, the contents of which is hereby incorporated by reference in its entirety.

BACKGROUND

The present disclosure relates to compositions comprising an epoxidized vegetable oil or a derivative thereof, a carboxyl-functionalized resin, and a liquid reactive diluent. The compositions may be used, for example, in composites, coatings, elastomer formulations, and adhesive formulations.

Thermoset and thermoplastic compositions are useful in a variety of applications including, for example, fiber reinforced plastics, castings, and gel coats. Unsaturated polyesters have been of interest in the composite industry however previous formulations have suffered from various technical limitations such as high toxicity, high volatility, high flammability, and high shrinkage and warpage during processing. In addition, products can suffer from limited impact resistance due to brittleness of the polymerized resin matrix.

Accordingly, there remains a need in the art for improved compositions that can overcome the above-described technical limitations. It would be especially advantageous to provide compositions which possess low toxicity and volatility, low shrinkage and improved processability, and are derived, at least partially, from bio-based sources.

SUMMARY

An aspect of the present disclosure is a binder composition comprising: an epoxidized vegetable oil or a derivative thereof having an epoxy group content of 1 to 12 weight percent, based on the total weight of the epoxidized vegetable oil, and wherein the epoxidized vegetable oil comprises a fatty acid ester comprising $C_{5-26}$ alkyl groups; and a carboxyl-functionalized resin having an acid value of greater than or equal to 50; and a liquid reactive diluent; wherein a combined acid value of the carboxyl-functionalized resin and the liquid reactive diluent is 50 to 500.

Another aspect of the present disclosure is a binder composition comprising: 5 to 75 weight percent of an epoxidized vegetable oil or a derivative thereof having an epoxy group content of 1 to 12 weight percent, based on the total weight of the epoxidized vegetable oil, and wherein the epoxidized vegetable oil comprises a fatty acid ester comprising $C_{5-26}$ alkyl groups; and 0 to 65 weight percent of a carboxyl-functionalized resin having an acid value of greater than or equal to 50; and 5 to 75 weight percent of a liquid reactive diluent; and 0 to 5 weight percent of an initiator; wherein weight percent of each component is based on the total weight of the binder composition; wherein a combined acid value of the carboxyl-functionalized resin and the liquid reactive diluent is 50 to 500; wherein the carboxyl-functionalized resin comprises a carboxyl-acid functionalized polymer comprising an unsaturated polyester, an acrylic polymer, or a combination thereof; wherein the liquid reactive diluent comprises at least one of: a hydroxyl-functionalized $C_{1-12}$ alkyl (meth)acrylate, a vinyl monomer, an allyl monomer, a ($C_{1-8}$ hydrocarbyl) hydrogen maleate, a bis($C_{1-8}$ hydrocarbyl) maleate, an adduct of an anhydride and an epoxidized fatty acid methyl ester, an anhydride that is at least partially esterified with a $C_{1-8}$ alcohol, a hydroxy-functionalized vinyl ester, dicyclopentadiene, an alkyl glycidyl ether, a fatty acid ester of an epoxidized oil, a trans-esterification reaction product of an epoxidized fatty acid methyl ester and a vinyl compound having pendant hydroxyl groups, said transesterification product having a number average molecular weight of 650 grams per mole or less, or a combination thereof.

A method for the manufacture of the binder composition comprises combining the components of the composition.

Another aspect of the present disclosure is a composition comprising a cured product derived from the binder composition.

Another aspect of the present disclosure is a composite comprising: a binder derived from a binder composition comprising: an epoxidized vegetable oil or a derivative there of having an epoxy group content of 1 to 12 weight percent, based on the total weight of the epoxidized vegetable oil and wherein the epoxidized vegetable oil comprises a fatty acid ester comprising $C_{5-26}$ alkyl groups; and a carboxyl-functionalized resin having an acid value of greater than or equal to 50; and a liquid reactive diluent; wherein a combined acid value of the carboxyl-functionalized resin and the liquid reactive diluent is 50 to 500; a reinforcing agent; and optionally, an additive composition.

Another aspect of the present disclosure is a composite comprising: 1 to 80 weight percent of a cured product derived from the binder composition of the present disclosure; 20 to 99 weight percent of a reinforcing agent comprising a mineral filler or a fibrous material; and optionally, an additive composition; wherein weight percent is based on the total weight of the composite.

Another aspect of the present disclosure is a method of preparing a composite, the method comprising curing the binder composition in the presence of a reinforcing agent to provide the composite, wherein curing the binder composition comprises heating the binder composition to a temperature of 10 to 250° C., or 20 to 250° C., optionally in the presence of an initiator, a catalyst, a silane coupling agent, or a combination thereof.

Another aspect is a binder composition, comprising: 5 to 65 weight percent of a liquid reactive diluent comprising an anhydride that is partially or fully esterified with a $C_{1-8}$ alcohol, a hydroxy-functionalized vinyl ester, a fatty acid ester of an epoxidized oil, or a combination thereof, wherein the liquid reactive diluent has a number average molecular weight of 1000 grams per mole or less, 950 grams per mole or less, or 650 grams per mole or less; and 5 to 30 weight percent of a colorant, wherein weight percent is based on the total weight of the binder composition.

Another aspect is a binder composition comprising: 4 to 70 weight percent of a reactive diluent comprising an anhydride that is esterified with a $C_{1-8}$ alcohol, a hydroxy-functionalized vinyl ester, a fatty acid ester of an epoxidized oil, or a combination thereof, wherein the liquid reactive diluent has a number average molecular weight of 950 grams per mole or less; 60 to 96 weight percent of an unsaturated polyester having an acid value of 5 to 150 in a vinyl reactive diluent; and optionally, 1 to 40 weight percent of a colorant; wherein weight percent of each component is based on the total weight of the binder composition.

Another aspect of the present disclosure is a method of emulsion polymerization, the method comprising: polymerizing a reaction mixture comprising water, an emulsifier, an ethylenically unsaturated monomer, an initiator, and an esterification reaction product of a unsaturated anhydride with a monofunctional $C_{1-8}$ alcohol and an epoxidized fatty acid methyl ester having a number average molecular weight of 950 grams per mole or less.

Another aspect of the present disclosure is a product derived from various compositions described herein.

An asphalt binder composition comprises: a polymeric product formed from the binder composition, a styrene-butadiene-styrene block copolymer; bitumen, and an additive.

The above described and other features are exemplified by the following detailed description.

DETAILED DESCRIPTION

Thermoset resins and more commonly, resins made from unsaturated polyesters (UPE) have been used in various applications, including fiber reinforced plastics, castings, and gel coats. UPEs are generally synthesized using propylene glycol, phthalic anhydride, and maleic anhydride which can provide the unsaturation to react with a reactive diluent like styrene or methyl methacrylate using free radical chemistry to generate a crosslinked matrix. These resins are made with high glycol:acid ratio and have low residual acid values in the range of 15-30. Another type of unsaturated polyester resin is a vinyl ester resin. These resins are formed by the esterification of the epoxy group of epoxy resins, for example through reaction of a vinyl monomer having a carboxylic group (e.g., methacrylic acid). Typical epoxy resins can include, but are not limited to, bisphenol A epoxies. These vinyl ester resins can also be dissolved in vinyl monomers (e.g., styrene) to reduce the viscosity. The vinyl ester resins can also be polymerized the same way as regular unsaturated polyesters (e.g., through free radical polymerization).

Styrene has been a predominant reactive diluent in the industry for use with UPEs or vinyl ester resins due to its low cost, availability, copolymerizability, excellent cutting power, and good heat strength properties. The use of styrene also presents drawbacks related to toxicity, volatility, flammability and excessive shrinkage. For example, heat-cured thermoset compositions including styrene can release styrene in the atmosphere during processing. Other diluents such as methyl methacrylate (MMA), alpha methyl styrene, and divinyl benzene face similar limitations, for example with regard to volatility, odor, availability, high shrinkage, or copolymerizability. Previous UPE compositions have also suffered from limited adhesion to fillers used in the composite, which can affect the final properties of the composite. The brittleness in the polystyrene moieties in the matrix can further hinder flexural and impact properties.

There is increasing interest in providing compositions which are bio-based and cause less atmospheric pollution. Bio-based epoxidized vegetable oils (EVOs) and derivatives thereof are of interest in an effort to overcome the above-described technical limitations. EVOs can be modified by acrylation or directly crosslinked by anhydrides. For example, epoxidized linseed oil (ELO) stone composites are described in U.S. Pat. No. 9,199,415, however the disclosed anhydride-containing formulations described therein suffer from increased toxicity of the anhydrides.

The use of EVOs or derivatives thereof in applications such as coatings or composites has been limited primarily because EVO crosslinking results in soft films or composites with low hardness. Without wishing to be bound by theory, the flexible fatty acid chains in EVOs (e.g., acrylated epoxidized soybean oil (AESO)) can result in poor mechanical properties like Barcol hardness, modulus, and lower heat distortion temperature. Furthermore, the functionalized EVOs tend to exhibit increased viscosity (e.g., a Brookfield viscosity of 20,000 cP or more at ambient temperature), which can be undesirable as lower viscosities can enable fiber wetting as well as higher fiber loading for fiber reinforced plastics (FRP). In stone composites, lower viscosities can facilitate release of air during the vibro-compression process. Air trapped in the composite matrix creates voids that can affect the mechanical properties and strength of the composite.

U.S. Pat. No. 10,513,566 discloses the use of carboxyl functional polyesters and acrylic resins with high acid values that can be used with epoxidized oils and its derivatives in binder applications for thermally cured high performance composites, coatings and adhesives and elastomers. The reactive binder system relies on the use of heat in the case of composites or inert solvents in the case of coating applications to fluidize and fuse the reactive components during the fabrication and application process, respectively.

The present inventor has advantageously identified particular compositions that can provide a desirable combination of properties, and therefore can find use across a range of applications, including composites, coatings, adhesives, and elastomer formulations. Specifically, a binder composition comprising an epoxidized vegetable oil or a derivative thereof having an epoxy group content of 1 to 12 weight percent, based on the total weight of the epoxidized vegetable oil, a carboxyl-functionalized resin, and a liquid reactive diluent wherein a combined acid value of the carboxyl-functionalized resin and the liquid reactive diluent is 50 to 500 has been found to be particularly advantageous. Without wishing to be bound by theory, it is believed that the compositions disclosed herein allow for simultaneous dual/hybrid polymerization, where polymerization is propagated by multiple modes of polymerization. The use of a liquid reactive diluent in conjunction with the highly functionalized EVO increases the liquid content in the composition which allows the use of a higher glass transition temperature (Tg) carboxyl-functionalized resin, resulting in improved mechanical and chemical properties. The liquid reactive diluent in which the high acid value carboxyl functionalized polyester is dissolved or dispersed can facilitate the processing of the resin for use as a liquid binder at near-room temperature conditions for composite and coating applications. Thus, the compositions disclosed herein are flowable liquids at ambient temperature (e.g., 25° C.). Epoxidized oils have limited cutting power compared to a reactive diluent, but further assist in fluidizing the binder composition and lowering the effective viscosity of the formulation. The higher the acid value of the resin, the higher the stoichiometric level of the highly functional epoxidized oil that can be utilized thereby increasing the liquid component in the composition and lowering the viscosity of the composition. Lower molecular derivatives such as epoxidized fatty acid methyl esters have improved cutting power and can be used as reactive diluents at higher levels in more flexible applications. The ability to process the compositions of the present disclosure at lower temperatures (e.g., 25-50° C.) greatly improves the ease of processing and increases the open time for processing the composite without adversely affecting the final performance properties. Thus, as shown and described herein, careful selection of the components of the composition can provide improved properties including, for example, high Barcol hardness, high impact resistance, chemical resistance, low water absorption, UV resistance, high gloss, high clarity, or a combination thereof. A significant improvement is therefore provided by the present disclosure.

Accordingly, an aspect of the present disclosure is a binder composition.

In an aspect, the binder composition comprises an epoxidized vegetable oil or a derivative thereof, a carboxyl-functionalized resin, and a liquid reactive diluent. In an aspect, the binder composition comprises an epoxidized vegetable oil or a derivative thereof, and a liquid reactive diluent, and optionally a carboxyl-functionalized resin. Advantageously, the binder composition is a liquid binder composition. For example, the binder composition is a liquid at room temperature (e.g., 25° C.). In some aspects, the binder composition can be provided as a reaction product of the epoxidized vegetable oil or a derivative thereof, the carboxyl-functionalized resin (when present), and the liquid reactive diluent, as will be discussed further herein.

The binder composition comprises an epoxidized vegetable oil or a derivative thereof (e.g., a corresponding ester derivative). The epoxidized vegetable oil is derived from a vegetable or plant-based raw material. Advantageously, the epoxidized vegetable oil (or its derivative) of the present disclosure can be non-toxic and non-volatile and made from sustainable plant-based raw materials. The epoxidized vegetable oils can therefore provide several advantages. It will be understood that the composition may comprise one or more epoxidized vegetable oils (or derivatives thereof).

Epoxidation of vegetable oils is a process whereby the unsaturated component of the oil or a derivative thereof is epoxidized. In an aspect, the epoxidized vegetable oil can comprise a fatty acid ester comprising $C_{5-26}$ alkyl groups. The $C_{5-26}$ alkyl groups can be linear or branched. Exemplary epoxidized vegetable oils suitable for use in the composition according to the present disclosure can include, but are not limited to, epoxidized soybean oil (ESO), epoxidized linseed oil (ELO), epoxidized palm oil, epoxidized castor oil, epoxidized sunflower oil, epoxidized canola oil, epoxidized palm oil, and the like. Combinations of two or more epoxidized vegetable oils or derivatives thereof are also contemplated.

Epoxidized vegetable oils can be produced, for example, using formic or acetic acid and hydrogen peroxide to generate performic acid or peracetic acid in situ. The unsaturated moieties of the vegetable oils are converted to oxirane (epoxy) groups. The reaction can be monitored using iodine values, where decreasing iodine values are indicative of increasing oxirane content of the oil. The epoxidized oil can be washed and separated from aqueous reactants and dried. During the process the oxirane can react with the acid, lowering the effective oxirane content. Epoxy content of the oil can be determined by a titration method with hydrobromic acid solution in acetic acid using AOCS standard test method Cd 9-57 (AOCS, 1998).

Epoxidized oils tend to react differently than fossil fuel-based epoxies. For example, a bisphenol A epoxy can react with amines at room temperature but have short pot life. Such epoxies can also chalk when exposed to sunlight over time. In contrast, aliphatic and cycloaliphatic epoxies can be slower to cure and more reactive towards carboxylic acids and anhydrides. Epoxidized vegetable oils can cure slowly due to the internal position of the oxirane group in the chain. Furthermore, the presence of long chains makes the cured resin soft, and the hydrocarbon chains are susceptible to marring. For these reasons, epoxidized oils, to date, have been more commonly used as plasticizers or acid scavengers.

The present inventor has advantageously discovered that an epoxidized vegetable oil can act as a non-volatile liquid component contributing to the lowering the viscosity of a binder composition. Thus, the epoxidized vegetable oil can improve the processing of the binder composition and performance of a final product including the binder composition.

In an aspect, lower molecular weight products like epoxidized fatty acid methyl esters (FAME) can be derived from epoxidized vegetable oils or bio diesel. The lower molecular weight derivatives can have solvent like properties without the volatile nature of solvents. The presence of functional groups can allow for further chemical modification. Epoxidized vegetable oils can be broken down through transesterification to form lower molecular derivatives leaving the epoxy groups intact. Lower molecular derivatives can have lower viscosities and improved solvency. For example, epoxidized methyl soyate has a Kauri-Butanol (KB) value of 249 compared to toluene which has a KB value of 105, as determined according to ASTM D1133.

The epoxidized vegetable oil or derivative thereof is a liquid at room temperature (e.g., at 25° C.). The epoxidized vegetable oil or derivative thereof comprises one or more polar epoxide groups and non-polar organic aliphatic chains.

The epoxidized vegetable oil or derivative thereof has an epoxy group content of 1 to 12 weight percent, based on the total weight of the epoxidized vegetable oil. Within this range, the epoxide content can be at least 3 weight percent, or at least 5 weight percent, or at least 7 weight percent, or at least 9 weight percent, or at least 11 weight percent. Also within this range, the epoxide content can be at most 11 weight percent, or at most 10 weight percent, or at most 8 weight percent, or at most 7.5 weight percent. For example, the epoxide content can be 2 to 12 weight percent, or 3 to 11.5 weight percent, or 5 to 10 weight percent, or 6.5 to 9.5 weight percent, or 6.5 to 7.5 weight percent, or 7 to 7.5 weight percent, or 8.5 to 9.5 weight percent, or 9 to 9.5 weight percent.

Without wishing to be bound by theory, it is believed that the epoxide content of the epoxidized vegetable oil of the present disclosure can provide a high reactivity of the oil through the number of oxirane/epoxide functionality sites on the oil. The epoxy groups can react with carboxyl functional groups present in the composition. As a specific example, use of epoxidized linseed oil with an epoxide content of at least 9 weight percent contains approximately 5 epoxide reaction sites and 3 ester sites per molecule. Thus, each oil molecule in this example can react with an average of approximately 5 equivalents of an acid, such as a carboxylic acid. In another example, use of epoxidized soybean oil having an epoxide content of at least 7 weight percent provides an average of 4.5 reactive groups per molecule.

In an aspect, the epoxidized vegetable oil can have a molecular weight of 100 to 2,000 Daltons. Within this range, the molecular weight can be 100 to 1,000 Daltons, or 100 to 750 Daltons, or 250 to 750 Daltons.

In an aspect, the epoxidized vegetable oil does not comprise acrylate groups. Stated another way, the epoxidized vegetable oil is not an acrylated epoxidized vegetable oil. The binder composition according to the present disclosure can therefore exclude acrylated epoxidized vegetable oil in some aspects.

The epoxidized vegetable oil is present in the binder composition in an amount of greater than 0 to less than or equal to 75 weight percent, based on the total weight of the binder composition. Within this range, the epoxidized vegetable oil can be present in an amount of at least 1 weight percent, or at least 5 weight percent, or at least 10 weight percent, or at least 15 weight percent, or at least 20 weight percent, or at least 25 weight percent. Also within this range, the epoxidized vegetable oil can be present in an amount of less than or equal to 70 weight percent, or less than or equal to 65 weight percent, or less than or equal to 60 weight percent, or less than or equal to 55 weight percent, or less than or equal to 50 weight percent, or less than or equal to 45 weight percent. For example, the epoxidized vegetable oil can be present in the binder composition in an amount of 1 to 75 weight percent, or 5 to 75 weight percent, or 10 to 75 weight percent, or 1 to 65 weight percent, or 5 to 65 weight percent, or 10 to 65 weight percent or 10 to 50 weight percent, or 15 to 50 weight percent, or 20 to 50 weight percent, or 20 to 45 weight percent, each based on the total weight of the binder composition.

In addition to the epoxidized vegetable oil, the binder composition optionally further comprises a carboxyl-functionalized resin. As used herein, the term "carboxyl-functionalized resin" refers to a resin comprising a carboxylic acid group, an anhydride group, or a combination thereof. The carboxyl-functionalized resin is a curable compound selected to be compatible with the epoxidized vegetable oil and the liquid reactive diluent. In an aspect, the carboxyl-functionalized resin can have a high glass transition temperature (Tg). For example, the carboxyl-functionalized resin can have a Tg of 10° C. or more, or 20° C. or more, or 25° C. or more, or 30° C. or more, or 50° C. or more, or 60° C. or more, or 70° C. or more. In an aspect, the carboxyl-functionalized resin can have a Tg of 10 to 100° C., or 20 to 100° C., or 30 to 90° C., or 40 to 80° C., or 50 to 70° C., or 50 to 60° C., or 50 to 100° C. Tg can be determined by Differential Scanning Calorimetry (DSC) or Dynamic Mechanical Analysis (DMA). DSC is more commonly used. A Differential Scanning Calorimeter (DSC) allows for the determination of the melting temperature (Tm), glass transition (Tg), and crystallinity of the polymer sample. Determination of the samples kinetic events e.g., utilizing TA Q2000 where the sample is placed in a pan and subjected to a temperature at a specified rate, usually 5-10° C./min while the instrument measures the difference in the heat flow between the sample and a reference. A heat/cool/heat cycle is performed to investigate the thermal history of the sample if present. The Tg of the resin affects the processability when the binder is heated in a composite formulation or the solvency and viscosity in a liquid coating. A higher Tg resin can gives a harder polymer and better chemical resistance but can encounter challenges in flexibility, impact and processability. It is dependent on the polymer structure and choice of the co monomers used to make the polymer. In an aspect, a Tg of one of the polyesters in this invention measures around 64.8° C.

In an aspect, the carboxyl-functionalized resin can be initially in the form of a solid, for examples as a powder, flakes, granules, or a combination thereof. When incorporated into the binder composition, the carboxyl-functionalized resin can be dissolved or homogenously dispersed in the liquid reactive diluent at a temperature of 25° C.

The present inventor has discovered that certain technical advantages arise from selection of a carboxyl-functionalized resin having a high acid value. Accordingly, in an aspect, the carboxyl-functionalized resin has an acid value of greater than or equal to 50, or 50 to 500, or 50 to 300, or 100 to 300, or 200 to 300. The acid value is a measure of potassium hydroxide (mg) that is required to neutralize the free acid contained in unit mass (g) of chemical substance. A known quantity of the polyester sample is dissolved in an inert solvent and titrated to its end point volumetrically or potentiometrically with a known normality of potassium hydroxide solution in presence of indicator like phenolphthalein. For potentiometric titration, the large increase in potential difference signifies the endpoint of the reaction. Without wishing to be bound by theory, it is believed that the high acid values of the resin can catalyze the reaction at higher temperatures but can be stable at room temperature in the absence of a catalyst. This results in long pot life even when the reactive components of the composition are mixed together (e.g., ranging from hours to days to months). Even when the temperature is raised from room temperature to 30° C., or from 25° C. to 35° C. or 50° C., or 65° C., the composition can exhibit low viscosity increases, for example from 1100 to 1500 cP over the course of 1 hour at 35° C.

In an aspect, the carboxyl-functionalized resin can comprise carboxylic acid-functionalized resin comprising a carboxyl-functionalized polymer. As used herein, the term "polymer" refers to a molecule comprising 3 or more repeating units. In an aspect, the carboxyl-functionalized resin can a discrete molecule (i.e., is non-polymeric, and does not comprise a plurality of repeating units).

In an aspect, the carboxyl-functionalized resin can comprise a polyester, an acrylic polymer, or a combination thereof.

Polyesters are condensation products prepared from the reaction of a polyacid with a diol or triol. The choice of polyol and the polyacids affect the final properties of the resin. There are various polyacids and poly anhydrides available commercially. Exemplary acids can include, but are not limited to, phthalic anhydride or its acid analog, isophthalic acid, terephthalic acid, cyclohexane dicarboxylic acid, succinic acid or its anhydride, maleic acid, or its anhydride, adipic acid, oxalic acid, a $C_{12}$ diacid, a $C_{18}$ diacid (i.e., octodecanedioic acid), azaleic acid, sebacic acid, tetrahydrophthalic anhydride, and the like. Combinations of the foregoing acids are also contemplated. Halogenated polyacids can be used, for example when increased flame retardancy may be desired. In an aspect, a cyclopentadiene based polyester can be prepared from reaction of an unsaturated ester of maleic anhydride with dicyclopentadiene in the presence of water.

Exemplary diols for preparing a polyester can include, but are not limited to, ethylene glycol, propylene glycol, diethylene glycol, neopentyl glycol, tripropylene glycol, 1,4-cyclohexanedimethanol, 1,4-butanediol, 1,6-hexanediol, 2-methyl-1,3-propanediol, and the like or a combination thereof. Exemplary triols can include, but are not limited to, trimethylol ethane, trimethylol propane, glycerol, and the like, or a combination thereof.

In an aspect, the polyester can comprise a carboxylic acid end group, a hydroxyl end group, or a combination thereof. In an aspect, the polyester can comprise a carboxylic acid end group, and the carboxylic end groups of the polyester can be capped, for example with a monohydric alcohol (e.g., benzyl alcohol) or a mono-carboxylic acid (e.g., benzoic acid). In an aspect, the carboxylic group is reacted with a fatty acid ester of epoxidized oil. Long chain fatty acids with or without unsaturation can also be used though that can introduce oxidatively reactive sites, softness or flexibility in the polymer, if desired.

In an aspect, raw materials for forming the polyester can be derived from fossil fuels. In an aspect, raw materials derived from fossil fuels can be replaced (partially or completely) with bio-based analogs such as 1,3-propanediol made from crude glycerol or 1,4-butane diol and succinic acid from fermentation, sebacic acid produced from castor oil, or itaconic acid or anhydride substituted for maleic acid or anhydride.

When polyols and poly acids are reacted together in a polycondensation to form a polyester, the initial acid value as well as the free hydroxyl value is generally high, but is reduced as the polyester is formed. The viscosity also increases. Tin-based catalysts or acids such as p-toluene sulfonic acid can be used to accelerate the process. As the reaction proceeds and the viscosity increases the ratio of free carboxylic and free hydroxyl groups decreases. Pushing the reaction to further completion can require higher temperature as the concentration of the reactive groups decreases. For example, temperatures as high as 250° C. can be helpful to achieve suitable conversion. Despite various methods to achieve completion there may often be residual polyol or poly acid or anhydrides in the system. If anhydrides like maleic or phthalic anhydrides are used in the synthesis, there may be some free residual anhydride in the polyester. The reaction is concluded when the desired acid number is reached. When the carboxylic to hydroxyl equivalence ratio is 1.0, a very high molecular weight polymer can be produced if all the hydroxyl groups are pushed to completion. For practical purposes, the molecular weight can be controlled by the extent of carboxyl groups consumed. Hence free hydroxyl groups and free carboxyl groups, or residual anhydride are present in the polyester. Typically, when unsaturated polyesters are synthesized, the equivalence or mole ratio can be close to 1.0. Higher molar ratios of carboxyl to hydroxyl groups can give higher acid value polyesters. High acid value polyesters are generally not very soluble in styrene and tend to precipitate in styrene and articles made from them are susceptible to attack from water. The carboxyl group has an unfavorable effect on the miscibility of the polyester with styrene. For conventional UPE, lower acid value unsaturated resins have advantages when used with styrene. They tend to be more soluble and compatible with styrene. Hence, the acid value is kept as low as possible as the carboxylic groups do not participate in the curing process and can be detrimental e.g., lower alkali resistance, higher water sensitivity lower corrosion resistance.

The present disclosure uses polyesters made from high excess equivalent ratio of carboxyl groups to hydroxyl groups to achieve a polyester with high final acid value, which can be achieved using, but not limited, to the various aforementioned polyols and triols. These groups can be utilized in crosslinking with aliphatic epoxidized vegetable oil or other aliphatic epoxies. The final acid value can be, for example, 50 or more, or 75 or more, or 275 or more, or 300 or more, or 350 or more, or 450 or more. In an aspect, the polyester resin is made with fumaric acid or maleic acid or anhydride. In an aspect, after making the polyester with maleic anhydride the maleic unsaturation can undergo Diels-Alder reaction with dicyclopentadiene. Depending on the type of raw materials used esterification can impart crystallinity to the polyester. When dissolved in a reactive diluent the crystalline portions may exhibit lower solubility while the amorphous portions of the polymer can exhibit good solubility resulting in a dispersion. The crystalline portions can melt when subjected to heat.

In an aspect, the polyester is an unsaturated polyester. An unsaturated polyester can be prepared from, for example, an unsaturated diacid or anhydride (e.g., maleic anhydride). In an aspect, the composition according to the present disclosure can have 3 weight percent or less of residual free anhydride groups.

In an aspect, the carboxyl-functionalized resin can comprise an acrylic polymer. The acrylic polymer (also referred to as a polyacrylic resin) can include polymers or copolymers comprising carboxylic group-containing moieties capable of reaction with an epoxy group, for example, (meth)acrylic acid, maleic anhydride or comprising hydroxyl groups, such as hydroxy ethyl methacrylate. Comonomers such as methyl methacrylate, glycidyl methacrylate, vinyl-based monomers (e.g., styrene), butyl methacrylate, can optionally be included. In an aspect, these monomers can be excluded from the acrylic polymer. A free radical initiator is generally used to solution polymerize the monomer in presence of an inert solvent. After synthesis the solvent is removed. The product is pulverized to powder on cooling or dissolved in a reactive diluent. In an aspect a glycidyl methacrylate-based acrylic copolymer (e.g., such as the commercially available ISOCRYL EP-555) can be blended with epoxidized oil to form the epoxy component of the present disclosure.

In an aspect, the carboxyl-functionalized resin can minimize or exclude the presence of hydroxyl groups in the resin. For example, the carboxyl-functionalized resin can have a hydroxy number of less than 40, or less than 30, or less than 20, or less than 10, or less than 5, or less than 1. In an aspect, the carboxyl-functionalized resin does not include any hydroxyl groups. For example, the carboxyl-functionalized resin can comprise a polyester or an acrylic resin having no hydroxyl groups along the backbone of the resin.

The carboxyl-functionalized resin can have a number average molecular weight of 220 to 25,000 Daltons. In an aspect, the carboxyl-functionalized resin can have a molecular weight of 500 Daltons or more. In an aspect, the carboxyl-functionalized resin can have a molecular weight of 20,000 Daltons or less, or 15,000 Daltons or less, or 10,000 Daltons or less, or 5,000 Daltons or less, or 4,000 Daltons or less, or 3,000 Daltons or less, or 2,000 Daltons or less.

In a specific aspect, the carboxyl-functionalized resin can comprise an unsaturated polyester and can have a molecular weight of 220 to 5,000 Daltons, or 220 to 4,500 Daltons, or 220 to 3,000 Daltons, or 220 to 2,500 Daltons, or 220 to 2,000 Daltons, or 500 to 5,000 Daltons, or 650 to 5,000 Daltons, or 1,000 to 5,000 Daltons, or 1,500 to 5,000 Daltons, or 2,000 to 5,000 Daltons.

In a specific aspect, the carboxyl-functionalized resin comprises an acrylic polymer and can have a molecular weight of 500 to 25,000 Daltons, or 500 to 20,000 Daltons, or 500 to 15,000 Daltons.

Molecular weight can be determined by gel permeation chromatography (GPC), for example, eluting with tetrahydrofuran and relative to polystyrene standards. For example, the molecular weight (Mn) of a polyester resin synthesized in accordance with the present disclosure was found to have a Mn of 675 Da measured according to this method. Molecular weight can also be determined using end group analysis, for example based on $^1$H nuclear magnetic resonance (NMR) spectroscopy.

The carboxyl-functionalized resin can be present in the binder composition in an amount of 0 to 65 weight percent, based on the total weight of the binder composition. Within this range, the carboxyl-functionalized resin can be present in an amount of greater than 0, or at least 1 weight percent, or at least 5 weight percent, or at least 10 weight percent, or at least 15 weight percent, or at least 20 weight percent, or at least 25 weight percent. Also within this range, the carboxyl-functionalized resin can be present in an amount of less than or equal to 60 weight percent, or less than or equal to 55 weight percent, or less than or equal to 50 weight percent, or less than or equal to 45 weight percent. For example, the carboxyl-functionalized resin can be present in the binder composition in an amount of 1 to 65 weight percent, or 5 to 65 weight percent, or 3 to 50 weight percent, or 5 to 45 weight percent, or 10 to 40 weight percent, each based on the total weight of the binder composition. In a specific aspect, no carboxyl-functionalized resin is included in the composition. For example, in an aspect, the binder composition does not include a carboxyl-acid functionalized polymer comprising an unsaturated polyester, an acrylic polymer, or a combination thereof.

In addition to the epoxidized vegetable oil and the carboxyl-functionalized resin (when present), the binder composition further comprises a liquid reactive diluent. The liquid reactive diluent is selected to dissolve or homogenously disperse the carboxyl-functionalized resin at room temperature. For example, depending on the extent of crystallinity in the carboxyl-functionalized resin, the liquid reactive diluent can completely or partially solubilize the resin or disperse the resin. In the case where the carboxyl-functionalized resin is dispersed in the liquid reactive diluent, the dispersed portions of the carboxyl-functionalized resin will melt or clear upon curing (e.g., when subjected to elevated temperatures).

The liquid reactive diluent comprises a functional group capable of reacting with either or both of the epoxidized vegetable oil and the carboxyl-functionalized resin. Exemplary functional groups that may be present on the liquid reactive diluent can include, but are not limited to, hydroxyl groups, polymerizable ethylenically unsaturated groups, epoxy (i.e., oxirane) groups, and carboxyl groups. In a specific aspect, when the liquid reactive diluent comprises a functional group capable of reacting with the epoxidized vegetable oil (e.g., wherein the liquid reactive diluent comprises a carboxyl group capable of reacting with an epoxy group of the oil), the liquid reactive diluent can substitute for the carboxyl-functionalized resin. In an aspect the reactive diluent is a carboxylic functional compound that can react with an epoxidized oil or its derivative or an alkyl glycidyl ether. In a specific aspect, when a reactive diluent that has carboxylic groups is used, the carboxylic functional resin (e.g., the unsaturated polyester, an acrylic polymer, or a combination thereof) may be omitted from the composition.

In an aspect, the liquid reactive diluent can comprise a hydroxyl-functionalized $C_{1-12}$ alkyl (meth)acrylate or a derivative thereof (e.g., a reaction product of the hydroxyl-functionalized $C_{1-12}$ alkyl (meth)acrylate and an anhydride). In a specific aspect, the liquid reactive diluent can comprise a hydroxyl-functionalized $C_{1-6}$ alkyl (meth)acrylate, such as 2-hydroxyethyl methacrylate.

In an aspect, the liquid reactive diluent can comprise a ($C_{1-8}$ hydrocarbyl) hydrogen maleate, a bis($C_{1-8}$ hydrocarbyl) maleate, or a combination thereof. For example, in a specific aspect, the liquid reactive diluent can comprise butyl hydrogen maleate.

In an aspect, the liquid reactive diluent can comprise a mono-, di-, or poly-functional acrylate ester or can be derived from and unsaturated anhydride or polyacid. In an aspect, a polyisocyanate molecule (e.g., isophorone diisocyanate (IPDI)) can react with a hydroxyl functional vinyl monomer or in combination with a monohydric alcohol to introduce vinyl and urethane groups in the formulation. Urethane groups can increase viscosity of the formulation. Thus, when 1.25 equivalents of IPDI was reacted with 1.27 equivalents of 2-hydroxyethyl methacrylate under a dry nitrogen atmosphere using 0.1% of dibutyl tin dilaurate catalyst at 40-95° C. until all of the free isocyanate is consumed provides a viscous, free radically reactive material. The material can be cut in more 2-hydroxyethyl methacrylate or other reactive diluents as described herein to lower the viscosity. In an aspect, an isocyanate terminated prepolymer made from a polyester or polyether diol (often known as acrylated urethane prepolymers) can also be reacted with the hydroxyl acrylate. Using these unsaturated urethane oligomer adducts as performance enhancing add-ons can provide, for example, improved mechanical strength, adhesion, abrasion resistance and hardness of the composite or elastomer. When present, the unsaturated urethane oligomer adducts can be introduced to the binder composition as a concentrate containing 60 to 95 percent of the liquid reactive diluent and 5 to 40 percent by weight of the oligomer, based on the total weight of the concentrate.

In an aspect, the liquid reactive diluent can be derived from a vegetable oil. For example, the liquid reactive diluent can comprise a free radically polymerizable ethylenically unsaturated group and can be derived from vegetable oil. In an aspect, the epoxidized vegetable oil can be (meth)acrylated, for example through reaction with acrylic acid or methacrylic acid. (Meth)Acrylation of epoxy groups represents an exemplary method for introducing unsaturated groups to epoxidized vegetable oils and their derivatives. However, the viscosities of these derivatives are lower than their oil analogs. Hence the lower molecular weight derivatives can act as liquid reactive diluents. Epoxidized oils and derivatives can also be partially acrylated to create unsaturation but curtail viscosity increases. Epoxidized soybean oil has a viscosity of around 400 centipoise (cP). A typical acrylated fully epoxidized soybean oil with less than 0.2% free oxirane (Ebecryl 5848) has a Brookfield viscosity of 20,000 cP from the formation of hydroxyl groups from acrylation. However, partially acrylated epoxidized oil or its derivative can participate in free radical polymerization as well as epoxy-carboxy reactions ensuring uniform compatibility of the various components in the formulations. Partial acrylation can curtail viscosity increases that can accompany acrylation. The free epoxy groups can also be used in the curing process. Metathesis of plant oil, for example palm oil, using ruthenium-based catalysts followed by transesterification can produce shorter unsaturated fatty acid chains, such as $C_{10}$ and $C_{12}$ methyl esters. These methyl esters can be epoxidized and can also be used or further derivatized for use as reactive diluents. In an aspect, the liquid reactive diluent can be a transesterification reaction product of an epoxidized fatty acid methyl ester and a vinyl compound having pendant hydroxyl group. In an aspect, the liquid reactive diluent comprises an esterified epoxidized vegetable oil derivative having a number average molecular weight of 650 Daltons or less. When the liquid reactive diluent is derived from a vegetable oil, the vegetable oil of the liquid reactive diluent is different from the epoxidized vegetable oil or derivative thereof of the binder composition (e.g., in chemical composition, molecular weight, or both).

In an aspect, an epoxidized fatty acid methyl ester (eFAME) can react with a saturated or an unsaturated anhydride. For example, trimellitic anhydride (TMA) can form an adduct of the anhydride by consuming the epoxy functionality of the epoxidized FAME. This adduct can have high acid values, for example 150 or more, or 175 or more, or 200 or more, or 250 or more. In an aspect, the acid value can be 150 to 250. The product is a viscous liquid that can be cut in the epoxidized FAME or diluted with the epoxidized oil or a diluent based on a partial or diester of maleic anhydride.

In an aspect, the liquid reactive diluent can comprise an anhydride that is at least partially esterified with a $C_{1-8}$ alcohol (e.g., a monoalcohol), a hydroxy-functionalized vinyl ester, dicyclopentadiene, an alkyl glycidyl ether, a fatty acid ester of an epoxidized oil, or a combination thereof. For example, the liquid reactive diluent can be a saturated or unsaturated, aliphatic, alicyclic, aromatic, or cycloaliphatic anhydride or polyacid compound that is partially or fully esterified with dicyclopentadiene, an alkyl glycidyl ether, one or more alcohols (including monohydric or polyhydric alcohols) or with hydroxyl-functional vinyl esters or fatty acid esters of epoxidized oils or a combination thereof. In an aspect, the alkyl glycidyl ether can be, for example, 2-ethylhexyl glycidyl ether, butyl glycidyl ether. Other alkyl glycidyl ethers can include di- or triglycidyl ether (e.g., ethylene glycol diglycidyl ether). These alkyl glycidyl ethers are also available under the trade name HELOXY™. It is understood that in esterification reactions the final product may have residual reactants. In an aspect, when present, any residual reactants can be present in an amount of 25 weight percent or less, or 15 weight percent or less, or 10 weight percent or less, or 5 percent or less. In an aspect the residual amount of epoxidized fatty acid methyl ester can be 25 weight percent or more.

In an aspect, the liquid reactive diluent is a non-flammable liquid reactive diluent. In an aspect, when the liquid reactive diluent comprises ethylenic unsaturation, the liquid reactive diluent can comprise a monofunctional (meth)acrylate or vinylic compound. In an aspect, the liquid reactive diluent can exclude multifunctional (meth)acrylate or vinylic compounds.

In an aspect, the liquid reactive comprises at least one of: a hydroxyl-functionalized $C_{1-12}$ alkyl (meth)acrylate, a vinyl monomer (e.g., styrene, α-methyl styrene, vinyl toluene, chlorostyrene, methyl (meth)acrylate), butyl (meth)acrylate, diallyl phthalate, divinylbenzene, and the like or a combination thereof), an allyl monomer, a ($C_{1-8}$ hydrocarbyl) hydrogen maleate, a bis($C_{1-8}$ hydrocarbyl) maleate, an adduct of an anhydride and an epoxidized fatty acid methyl ester, an anhydride or diacid that is at least partially esterified with a $C_{1-8}$ alcohol, a hydroxy-functionalized vinyl ester, dicyclopentadiene, an alkyl glycidyl ether, a fatty acid ester of an epoxidized oil, a transesterification reaction product of an epoxidized fatty acid methyl ester and a vinyl compound having pendant hydroxyl groups, said transesterification product having a number average molecular weight of 950 grams per mole or less, or 650 grams per mole or less, or a combination thereof.

In an aspect, the liquid reactive diluent can comprise the anhydride that is at least partially esterified with a $C_{1-8}$ alcohol, a hydroxy-functionalized vinyl ester, dicyclopentadiene, an alkyl glycidyl ether, or a fatty acid ester of an epoxidized oil. In an aspect, the liquid reactive diluent can have a number average molecular weight of 1000 grams per mole or less, 950 grams per mole or less, or 650 grams per mole or less.

The liquid reactive diluent can be present in the composition in an amount of greater than 0 to 75 weight percent, based on the total weight of the binder composition. Within this range, the liquid reactive diluent can be present in an amount of at least 1 weight percent, or at least 5 weight percent, or at least 10 weight percent, or at least 20 weight percent. Also within this range, the liquid reactive diluent can be present in an amount of at most 70 weight percent, or at most 60 weight percent, or at most 50 weight percent, or at most 40 weight percent. For example, the liquid reactive diluent can be present in an amount of 5 to 50 weight percent, or 5 to 40 weight percent, or 10 to 40 weight percent, or 20 to 40 weight percent, each based on the total weight of the binder composition.

The epoxidized vegetable oil, the carboxyl-functionalized resin, and the liquid reactive diluent can be present in amounts effective to provide stoichiometric ratio of epoxy groups to carboxylic groups of 0.85:1 to 1.5:1.

The present inventor has advantageously discovered that the binder composition described herein can exhibit certain advantageous properties when a combined acid value of the carboxyl-functionalized resin and the liquid reactive diluent is 50 to 500.

In an aspect, the binder composition described herein can comprise 3 weight percent or less of residual unreacted anhydride groups, based on the total weight of the carboxyl-functionalized resin and the liquid reactive diluent.

In an aspect, the binder composition can minimize or exclude an inert solvent. For example a solvent can be present in the binder composition in an amount of less than 5 weight percent, or less than 1 weight percent, or less than 0.1 weight percent, each based on the total weight of the binder composition. In an aspect, a solvent is excluded from the binder composition.

Another aspect is a binder composition comprising 4 to 40 weight percent of a reactive diluent comprising an anhydride that is esterified with a $C_{1-8}$ alcohol, a hydroxy-functionalized vinyl ester, a fatty acid ester of an epoxidized oil, or a combination thereof, wherein the liquid reactive diluent has a number average molecular weight of 950 grams per mole or less, or 650 grams per mole or less; 60 to 96 weight percent of an unsaturated polyester having an acid value of 5 to 150 in a vinyl reactive diluent; and optionally, 1 to 40 weight percent of a colorant; wherein weight percent of each component is based on the total weight of the binder composition.

Another aspect is a binder composition comprising 5 to 65 weight percent of a liquid reactive diluent comprising an anhydride that is partially or fully esterified with a $C_{1-8}$ alcohol, a hydroxy-functionalized vinyl ester, a fatty acid ester of an epoxidized oil, or a combination thereof, wherein the liquid reactive diluent has a number average molecular weight of 950 grams per mole or less, or 650 grams per mole or less; and 5 to 30 weight percent of a colorant, wherein weight percent is based on the total weight of the binder composition. Exemplary colorants are further discussed in detail below.

In another specific aspect, the binder composition comprises the epoxidized vegetable oil or derivative and the liquid reactive diluent. The carboxyl-functionalized resin may be excluded from the binder composition. The epoxidized vegetable oil or derivative thereof is a fatty acid ester of an epoxidized oil. The liquid reactive diluent is the anhydride that is at least partially esterified with a $C_{1-8}$ alcohol, a hydroxy-functionalized vinyl ester, dicyclopentadiene, an alkyl glycidyl ether, or a combination thereof. The binder composition can optionally further comprise a vinyl ester resin or an unsaturated polyester resin with an acid value of 5 to 250; a vinyl monomer; and an initiator. In an aspect, the binder composition may comprise 4 to 75 weight percent of the binder composition (e.g., comprising the epoxidized vegetable oil or derivative thereof being a fatty acid ester of an epoxidized oil, and the liquid reactive diluent being the anhydride that is at least partially esterified with a $C_{1-8}$ alcohol, a hydroxy-functionalized vinyl ester, dicyclopentadiene, an alkyl glycidyl ether, or a combination thereof), and 60 to 96 weight percent of the unsaturated polyester, the vinyl ester resin, and the vinyl monomer. The binder composition can optionally further comprise 1 to 40 weight percent of a colorant. Weight percent of each of the foregoing components is based on the total weight of the binder composition.

In some aspects, the binder composition can optionally further comprise styrene. As mentioned earlier, styrene is volatile and can contribute to product VOCs. Styrene also has a disagreeable odor and can cause shrinkage in composite formulations. However, the presence of styrene can also lower viscosities in UPEs and vinyl esters, offering high Tg and good heat deflection properties for the cured binder. Typically 45 to 50 percent styrene is needed in formulations for good performance. The use of dicyclopentadiene based resins can lower the amount of styrene required to 35 percent but tend to suffer from brittleness. The present inventors has advantageously found that the amount of styrene can be reduced in binder compositions of the present disclosure. For example, the amount of styrene can be reduced by increasing the amount of other reactive diluents and introducing bio content in the binder composition. The use of liquid reactive components like epoxidized oils or their lower molecular weight derivatives can effectively lower the amount of styrene used in the binder composition, add bio-based content to the product, and lower the shrinkage in the final cured composite. In an aspect, the amount of styrene in a binder formulation according to the present disclosure can be reduced to 14 percent or less by weight, based on the total weight of the binder composition. In an aspect, the styrene content of the binder composition can be 10 percent by weight or less, based on the total weight of the binder composition.

Binder compositions comprising derivatives of epoxidized oils (e.g., with unsaturated monomers than can be used in free radical polymerizations) represent another aspect of the present disclosure. For example, a binder composition can comprise a first component comprising: an adduct of an anhydride and an epoxidized fatty acid methyl ester; an anhydride that is at least partially esterified with a $C_{1-8}$ alcohol, a hydroxy-functionalized vinyl ester, dicyclopentadiene, a ($C_{1-12}$) alkyl glycidyl ether, a fatty acid ester of an epoxidized oil having 1 to 12% by weight of epoxy groups or its precursor, the epoxidized oil; a transesterification reaction product of an epoxidized fatty acid methyl ester and a vinyl-containing compound having pendant hydroxyl groups, said transesterification product having a number average molecular weight of 650 grams per mole or less; or a combination thereof; wherein a combined acid value of the first component is 2 to 475; and a second component comprising a hydroxyl-functionalized $C_{1-12}$ alkyl (meth) acrylate, a vinyl monomer, an allyl monomer, an unsaturated anhydride, or a combination thereof. In an aspect, the first component can comprise an anhydride that is at least partially esterified with the fatty acid ester of an epoxidized oil; the $C_{1-8}$ alcohol, the hydroxy-functionalized vinyl ester, dicyclopentadiene, a ($C_{1-12}$) alkyl glycidyl ether, or a combination thereof and is further esterified with the fatty acid ester of epoxidized oil. In an aspect, the binder composition can further comprise a third component comprising a vinyl ester resin or an unsaturated polyester resin having an acid value of 2 to 350, an initiator, or both. In an aspect, the binder composition can comprise 2 to 70 weight percent of the first component; 0 to 50 weight percent of the second component; and 25 to 95 weight percent of the third component; wherein weight percent is based on the total weight of the binder composition. In an aspect, the second component can comprise a vinyl monomer, and the composition can comprise 4 to 70 weight percent of the first component; 2 to 45 weight percent of the second component; 20 to 94 weight percent of the third component; and optionally, 1 to 40 weight percent of a colorant; wherein weight percent is based on the total weight of the binder composition. In an aspect, the binder composition can consist of the first component, the second component, and a fourth component, wherein the fourth component is an epoxidized oil or its derivative having epoxy group content of 1 to 12%; and wherein the first component is present in an amount of 5 to 95 weight percent; the second component is present in an amount of 0 to 40 weight percent; and the fourth component is present in an amount of 0 to 75 weight percent; wherein weight percent is based on the total weight of the binder composition. In an aspect, the second component can comprise a mono-, di-, or poly-functional acrylate ester or a vinyl monomer. In an aspect, the average molecular weight of the first component can be less than 1100 Daltons. In an aspect, the binder composition can further comprise an oligomer formed from reaction of an isocyanate or isocyanate-terminated prepolymer with a vinyl compound having pendent hydroxyl groups, wherein the oligomer is provided to the composition in the form of a concentrate comprising 60 to 95 weight percent of the first component and 5 to 40 weight percent of the oligomer. In an aspect, the binder composition can further comprise a colorant, wherein the colorant and the first component can be provided to the composition in the form of a concentrate comprising 30 to 95 weight percent of the first component and 5 to 70 weight percent of the colorant, based on the total weight of the concentrate. In an aspect, the binder composition can comprise the first component comprising the anhydride that is at least partially esterified with a $C_{1-8}$ alcohol, a hydroxy-functionalized vinyl ester, dicyclopentadiene, or a combination thereof and further esterified with a fatty acid ester of an epoxidized oil having 1 to 12% by weight of epoxy groups or its precursor, the epoxidized oil; and combining the second component comprising the vinyl monomer, the unsaturated anhydride, or a combination thereof; and wherein the binder composition can comprise a polymeric product formed from reaction of the first component and the second component in the presence of an initiator.

The binder compositions can be prepared by combining the components of the composition. The components can generally be added in any order. In an aspect, the binder composition can be made by a method comprising combining 30 to 95 weight percent of a liquid reactive diluent comprising an anhydride that is partially or fully esterified with a $C_{1-8}$ alcohol, a hydroxy-functionalized vinyl ester, a fatty acid ester of an epoxidized oil, or a combination thereof, wherein the liquid reactive diluent has a number average molecular weight of 950 grams per mole or less, or 650 grams per mole or less; and 5 to 70 weight percent of a colorant; to provide a concentrate, wherein weight percent is based on the total weight of the concentrate. The method further comprises combining the concentrate with the epoxidized vegetable oil or a derivative thereof and the carboxyl-functionalized resin to provide the final binder composition. In an aspect, two or more components of the binder composition may be pre reacted before combining (e.g. a derivative of vegetable oil like fatty acid ester of epoxidized vegetable oil is pre reacted with an unsaturated carboxyl functional diluent). The method can optionally further comprise reacting the components of the composition to provide a reaction product. In an aspect, the reaction product of the liquid reactive diluent with the epoxidized oil or the epoxidized fatty acid ester can provide an adduct having a molecular weight of 1300 grams per mole or less, or 950 grams per mole or less, or 650 grams per mole or less.

The binder compositions according to the present disclosure can be cured, optionally in the presence of one or more additional components to provide adducts or reaction products, cured compositions and composite articles suitable for a variety of applications. Accordingly, a composition comprising a cured product derived from the binder composition represents another aspect of the present disclosure. Cured products prepared from the compositions disclosed herein can be particularly well suited for use in composites, coatings, elastomer, asphalt formulations, and adhesive applications.

The cured product can be obtained by subjecting the binder composition to suitable cure conditions. For example, a cured product can be obtained by heating the binder composition to a temperature effective to cure the binder composition. In an aspect, curing the binder composition can comprise heating the binder composition to a temperature of 10 to 250° C. The cured product can comprise chemical crosslinks between the components of the binder composition. For example, the cured product can comprise crosslinks formed from reaction of the epoxy groups with the carboxyl-functionalized resin. For example, the cured product can comprise ester bonds formed from reaction of the carboxyl groups of the carboxyl-functionalized resin and the epoxy groups of the epoxidized vegetable oil.

In an aspect, an initiator, a catalyst, a silane coupling agent, or a combination thereof can be included in the binder composition to facilitate curing. Suitable initiators and catalysts can be selected by one of skill in the art based on the desired curing conditions and guided by the present disclosure. Exemplary initiators can include, but are not limited to, t-amyl perbenzoate, benzoyl peroxide, t-butyl perbenzoate, peroxy-carbonates, di-tert butyl peroxide, 2,5-bis(tert-butylperoxy)-2,5-dimethylhexane, dicumyl peroxide, methyl ethyl ketone peroxide with use of cobalt salts as accelerators, azo initiators and the like or a combination thereof. In a specific aspect, a peroxide initiator is present to facilitate thermal curing. In an aspect benzoyl peroxide in presence of tertiary amines can facilitate curing to process at low temperatures, such as 0 to 25° C. For example, dimethyl aniline is commonly used as a promotor for low temperature curing. Oxygen in air can inhibit surface polymerization resulting in a tacky surface. Additives such as, but not limited to, paraffin wax when added to binder compositions can mitigate such concerns. Photoinitiators, such as Norrish Type I & Type II, are also contemplated by the present disclosure. Appropriate initiators and amounts can be selected depending on the cure temperature to avoid excessive acceleration, exotherm and gassing in the product. For example, an initiator can be present in an amount of 0.1 to 5 wt %, or 1 to 5 wt %, or 2 to 5 wt %, each based on the total weight of the binder composition. In an aspect, curing and polymerization can also occur by simply heating even in the absence of a thermal initiator. In an aspect the epoxidized vegetable oil can undergo cationic polymerization.

Exemplary catalysts can include, but are not limited to, phosphonium catalysts (e.g., alkyl phosphonium bromide), imidazole catalysts (e.g., 1-methylimidazole), tetramethyl guanidine (TMG), triphenylphosphine, dicyanamids, and the like. Other possible catalysts can include hydroxyl compounds, carboxyl compounds, organometallic compounds, alkaline metal compounds, or ammonium or amine compounds. For example, suitable catalysts can include zinc, titanium, aluminum, and tin organometallic compounds, alkaline metal or ammonium halides, aliphatic and aromatic amines, or boron complexes. In an aspect, if unsaturated fatty acid moieties are present in the binder composition, metal driers including but not limited to cobalt or manganese salts can be used. Catalysts can lower the temperature of cure of the epoxy groups as well as the duration of cure. It can also affect the pot life of the product. Reaction of anhydride groups present in the acrylic can also be catalyzed by these catalysts. In some aspects, catalysts can be latent and active at higher temperatures and inclusion may not affect pot life.

In an aspect, the binder composition can be coated on a surface and subsequently cured to form a cured coating on the surface. In an aspect the binder composition may be diluted with low amounts inert solvent(s) to facilitate application (e.g., in coatings). Examples of inert solvents can include, but are not limited to, may be but not limited to propylene glycol monomethyl ether acetate (PM acetate), glycol ethers, ketones, non-hazardous air pollutant (HAP) solvents, non-flammable solvents, and the like, or a combination thereof. In an aspect, the inert solvent levels may be including in an amount of 30 weight percent or less, or 25 weight percent or less, or 10 weight percent or less, each based on the total weight of the composition. The surface can comprise, for example, metal, wood, glass, or plastic. In an aspect, the binder composition can be dispensed into a mold cavity and cured.

Another aspect of the present disclosure is a composite. The composite comprises a binder derived from a binder composition described herein and a reinforcing agent.

The reinforcing agent can comprise, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, flax, hemp, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well a combination thereof.

The fillers and reinforcing agents can optionally be coated with a layer of metallic material to facilitate conductivity, or surface treated with silanes to improve adhesion and dispersion with the polymer matrix, if desired. In addition, the reinforcing agent can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Co-woven structures include glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

In a specific aspect, the composite comprises the binder and a mineral filler. In an aspect, the mineral filler can comprise quartz, glass, titanium dioxide, silica, marble chips, or a combination thereof.

In an aspect, the composite can comprise 1 to 80 weight percent, or 3 to 15 weight percent, or 5 to 10 weight percent of the binder; and 20 to 99 weight percent, or 85 to 97 weight percent, or 90 to 95 weight percent of the reinforcing agent; wherein weight percent is based on the total weight of the composite. In a specific aspect, the composite can comprise 1 to 80 weight percent, or 3 to 15 weight percent, or 5 to 10 weight percent of the binder; and 20 to 99 weight percent, or 85 to 97 weight percent, or 90 to 95 weight percent of the reinforcing agent; wherein weight percent is based on the total weight of the composite, wherein the reinforcing agent comprises a mineral filler.

In another specific aspect, the composite can comprise a reinforcing agent comprising a fibrous material. Exemplary fibrous materials can include, but are not limited to, those comprising fibers (including continuous and chopped fibers) such as asbestos, carbon fibers, glass fibers, such as E, A, C, ECR, R, S, D, or NE glasses, or the like; fibers such as those derived from blends comprising at least one of aluminum silicates, aluminum oxides, magnesium oxides, and calcium sulfate hemihydrate or the like; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic polymers, poly(vinyl alcohol) or the like; or a combination of any of the foregoing fibrous materials. In an aspect, the fibrous reinforcing agent can comprise glass fiber, carbon fiber, or a combination thereof.

In an aspect, the composite can comprise 25 to 75 weight percent, or 55 to 75 weight percent of the binder; and 25 to 75 weight percent, or 20 to 45 weight percent of the reinforcing agent; wherein weight percent is based on the total weight of the composite. In a specific aspect, the composite can comprise 25 to 75 weight percent, or 55 to 75 weight percent of the binder; and 25 to 75 weight percent, or 20 to 45 weight percent of the reinforcing agent; wherein weight percent is based on the total weight of the composite, wherein the reinforcing agent comprises a fibrous material, for example glass fibers, carbon fibers, or a combination thereof.

The composite can optionally further comprise an additive composition, with the proviso that the additive(s) are selected so as to not significantly adversely affect the desired properties of the composite. Such additives can be mixed at a suitable time during mixing of the components for forming the composite. Exemplary additives can include antioxidants, heat stabilizers, light stabilizers, ultraviolet (UV) light stabilizers, plasticizers, lubricants, mold release agents, antistatic agents, colorants, surface effect additives, radiation stabilizers, flame retardants, and anti-drip agents. A combination of additives can be used. In general, the additives are used in the amounts generally known to be effective. For example, the total amount of the additives (other than any impact modifier, filler, or reinforcing agents) can be 0.01 to 5 weight percent, based on the total weight of the composite.

In an aspect, the composite can optionally further comprise a colorant. As used herein, the term "colorants" include pigments and dyes. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or a combination thereof.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or a combination thereof.

In an aspect, the binder composition or the composite can optionally comprise an antioxidant. Antioxidant additives can include organophosphites such as tris(nonyl phenyl) phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis [methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or a combination thereof.

In an aspect, the composition can include a colorant, and the colorant can be supplied to the composition in the form of a concentrate comprising the colorant and the liquid reactive diluent. In an aspect, the liquid reactive diluent for dispersing the colorant can comprise a transesterification reaction product of an epoxidized fatty acid methyl ester and a vinyl compound having pendant hydroxyl groups having a number average molecular weight of 950 grams per mole or less, or 650 grams per mole or less. The concentrate can comprise, for example, 20 to 80 weight percent of the liquid reactive diluent and 20 to 80 weight percent of the colorant, each based on the total weight of the concentrate.

The composites of the present disclosure can be useful as coatings, adhesive compositions, sealants, and elastomer compositions. Advantageously, the composites prepared from the binder composition of the present disclosure can provide high performance products exhibiting a desirable combination of properties. For example, in stone composites with particular fillers (e.g., quartz or titanium dioxide), the resulting composites can exhibit high hardness, low water absorption, high mechanical strength, stain resistance, chemical resistance, and heat resistance. A cured coating can exhibit excellent adhesion, high gloss, good clarity, toughness, low water absorption, solvent and chemical resistance, flexibility, and impact resistance. Exemplary formulations and properties are further described in the working examples below.

In an aspect, the composite can be prepared by combining the binder composition and the reinforcing agent and curing the binder composition in the presence of the reinforcing agent to provide the composite. Curing can comprise, for example, heating the mixture of the binder composition and the reinforcing agent to a temperature of 10 to 250° C., optionally in the presence of an initiator, a catalyst, or both. In an aspect, the binder composition can be pre-heated prior to contacting with the reinforcing agent and curing to form the composite. Pre-heating the binder composition can comprise heating to a temperature of 20 to 75° C.

The composites described herein can exhibit desirable physical properties. For example, the composites can exhibit a Barcol hardness of 40-50 (e.g., for a cured product of the binder composition), or 50-55 (e.g., for a fiber-reinforced composite), or greater than 80 (e.g., for a stone composite comprising a mineral filler such as quartz). The composites can advantageously exhibit low shrinkage. Shrinkage occurs at a molecular level when polymers melt and cool. During the curing process, the resin will shrink due to a chemical loss of volume from polymerization. There is also thermal contraction during the cool-down process after cure, which causes volumetric shrinkage. This affects semi-crystalline and amorphous polymers and influences how the material changes in volume as it transitions from a liquid to a solid. For example, styrene, on polymerization, shrinks by approximately 15 volume percent, and methyl methacrylate, on polymerization, shrinks by approximately 20 volume percent. See, e.g., (1983), Maleic anhydride, B. C. Trivedi and B. M. Culbertson, Plenum, New York, 1982, 871 pp. Unsaturated polyester (UPE) resins can shrink by 7 to 12% during the crosslinking reaction. The high volumetric cure shrinkage of UPE resins can be a problem when fiber reinforced UPE composites are used for applications that require high surface quality and tight thickness tolerances. The available solutions for decreasing the volumetric cure shrinkage of UPE resins usually results in undesirable viscosity increases or decreased mechanical properties of final products. Epoxy based resin compositions tend to have lower shrinkage. Advantageously, the compositions described herein exhibit very low shrinkage on curing. In an aspect, binder compositions described herein result in low volatility, very low shrinkage (e.g., less than 2-3% depending on the filler composition) or warpage, excellent adhesion, high toughness and impact resistance, long pot life compared to conventional unsaturated polyester systems. Epoxies due to the generation of hydroxyl groups impart excellent hydrogen bonding and adhesion.

The binder composition according to the present disclosure can also be particularly useful for asphalt applications. Modern asphalt pavements are formulated to resist rutting and sustain high shear at higher summer temperatures from transport vehicles carrying heavy loads as well as rutting and cracking at low temperatures during winter months. Bitumen is a common fossil-based asphalt binder used in paving roads, pavement, or roofing. Other polymer additives can be added to the composition to resist-high shear, cracking, and rutting. Commonly used additives include plastomers and elastomers. Elastomers can include, for example, styrene-butadiene-styrene block copolymers, for example styrene-butadiene-styrene diblock and triblock copolymers commercially available as Kraton™. These polymers are commonly used to modify asphalt due to better low temperature properties compared to reactive polymer additives. However, they require high shear due to higher blend viscosities. During delays in application (e.g., due to inclement weather conditions like rain or snow) formulated asphalt may have to be stored at higher temperatures for longer periods. Adding a bio-based modified oil which lowers viscosity with temperature can introduce bio-based content in the formulation as well as lower the blend viscosities. Polymerized acrylated vegetable oils have been used previously. A vinyl monomer can also be added to polymerize and create a block polymer. Controlling free radical polymerizations and processing the polymer can be difficult. The present inventor has found that hydrocarbyl (e.g., alkyl) maleate esters of epoxidized oils or their derivatives when reacted with a vinyl monomer like styrene can provide stable, high viscosity, bio-based polymers. These polymers can be hot blended with styrene-butadiene block polymers to effectively improve compatibilities and reduce shear viscosities in asphalt formulations.

Accordingly, an asphalt binder composition represents another aspect of the present disclosure. The asphalt composition comprises a polymeric reaction product derived from the binder composition as disclosed herein, particularly wherein the binder composition comprises the epoxidized vegetable oil or derivative thereof and the liquid reactive diluent, wherein epoxidized vegetable oil or derivative thereof is a fatty acid ester of an epoxidized oil; and the liquid reactive diluent is the anhydride that is at least partially esterified with a $C_{1-8}$ alcohol, a hydroxy-functionalized vinyl ester, or a combination thereof and a vinyl monomer which are reacted to form a polymer product. The asphalt composition further comprises a block copolymer of an alkenyl aromatic monomer and an alpha olefin, preferably a styrene-butadiene-styrene block copolymer. The asphalt composition further comprises bitumen and optionally an additive composition. The bitumen component may be natural bitumen or derived from mineral oil. In addition, oil derivatives obtained in the cracking process, bitumen pitch and tar, as well as mixtures thereof can be used as bituminous components. Examples of suitable components include distillation or straight run bitumen, slag bitumen, for example propane bitumen, blown bitumen, and mixtures thereof. Other suitable bitumens include mixtures of one or more of these bitumen with fillers, such as petroleum extracts, for example aromatic extracts, distillates or residues, or with oils. When present, an additive composition in the asphalt composition can comprise, for example, elastomers, non-bituminous binders, adhesion promoters, softening agents, rejuvenating agents and other suitable components.

Another aspect is a composition comprising a reaction product that is derived from reaction of the binder composition and a vinyl monomer, unsaturated anhydride, or a combination thereof, in the presence of an initiator to form a polymeric product. In an aspect, the composition may be in liquid form, or may be a flowable composition at room temperature (e.g., 25° C.).

Another aspect is a composition obtained by combining a reaction product derived from the esterification of a anhydride with fatty acid ester of epoxidized oil and a $C_{1-8}$ alcohol and a polyisocyanante, a polyisocyanate prepolymer, or a combination thereof; optionally, in the presence of a vinyl compound with pendant hydroxyl groups, a polyol, such as, for example castor oil. Additives as free radical initiators and tin-based catalysts may also be used. The binder composition used to provide the reaction product comprises the epoxidized vegetable oil or derivative thereof and the liquid reactive diluent, wherein the epoxidized vegetable oil or derivative thereof is a fatty acid ester of an epoxidized oil; and the liquid reactive diluent comprises the anhydride that is at least partially esterified with a $C_{1-8}$ alcohol, a hydroxy-functionalized vinyl ester, dicyclopentadiene, an alkyl glycidyl ether, or a combination thereof.

The present inventor has further discovered that an unsaturated vegetable oil derivative can be particularly useful in emulsion polymerization. Accordingly, another aspect of the present disclosure is a latex composition comprising a copolymer comprising repeating units derived from an ethylenically unsaturated monomer and an unsaturated vegetable oil derivative. The latex copolymer compositions can be prepared by emulsion polymerization techniques that are generally known. An exemplary synthesis is further described in the working examples below. For example, a method for emulsion polymerization can comprise polymerizing a reaction mixture comprising water, an emulsifier, an ethylenically unsaturated monomer, an initiator, and an esterification reaction product of an unsaturated anhydride with a monofunctional $C_{1-8}$ alcohol and an epoxidized fatty acid methyl ester having a number average molecular weight of 950 grams per mole or less, or 650 grams per mole or less.

The ethylenically unsaturated monomer can comprise for example, vinyl monomers like styrene, methyl (meth)acrylate, butyl (meth)acrylate, (meth)acrylic acid, acrylonitrile, hydroxyl ethyl (meth)acrylate and its derivatives, vinyl acetate, vinyl alcohol, acetone diacrylamide, and other vinyl monomers. The unsaturated vegetable oil derivative can comprise epoxy groups. In an aspect, the unsaturated vegetable oil derivative comprises an esterified epoxidized vegetable oil derivative having a number average molecular weight of 950 grams per mole or less, or 650 grams per mole or less. In an aspect, the epoxidized unsaturated vegetable oil derivative can comprise an esterification reaction product of a unsaturated anhydride with a monofunctional $C_{1-8}$ alcohol and an epoxidized fatty acid methyl ester having a number average molecular weight of 950 grams per mole or less, or 650 grams per mole or less.

Accordingly, the present disclosure provides formulations suitable for use in a variety of high performance, non-toxic products that are advantageously made from sustainable raw materials. A significant improvement is therefore provided by the present disclosure.

This disclosure is further illustrated by the following examples, which are illustrative and non-limiting.

EXAMPLES

Example 1

An epoxidized methyl soyate-trimellitic anhydride (TMA) adduct was prepared by heating epoxidized methyl soyate (5.4 grams) to 120° C. and adding trimellitic anhydride (3.3 grams) to the mixture. After 20 minutes, pentaerythritol 3-(4-hydroxy-3,5-di-tert-butylphenyl)propionate, obtained as IRGANOX 1010 (0.05 grams), and tris(2,4-di-tert-butylphenyl) phosphite, obtained as IRGAFOS 168 (0.02 grams) were added. The reaction was continued for 30 minutes to provide a pasty liquid product having an acid value of 240.

The epoxidized methyl soyate-TMA adduct (7.3 grams) was mixed with 2-hydroxyethyl methacrylate (HEMA, 2 grams), followed by addition of epoxidized vegetable oil (5.4 grams) having an epoxy equivalent weight of 170 to provide a curable composition. Initiator (tert-butylperoxy 2-ethylhexyl carbonate (TBEC), 0.1 grams) was added and thoroughly mixed. The curable composition was coated onto an aluminum panel as a film and thermally cured at 150° C. for 1 hour.

Composition and characterization of the curable composition and the resulting cured film is shown in Table 1. Amounts of each component are provided in weight percent (wt %) based on the total weight of the curable composition. Viscosity was measured on a cone plate viscometer. Pencil hardness was characterized according to ASTM D3363. Mar resistance was characterized according to a fingernail test, where the back of a fingernail is flicked across the coating surface. Any resulting permanent mark from this qualitative analysis is deemed as a failure. A rating of "pass" indicates that the fingernail test did not result in a mark or damage to the surface. Gloss was determined according to ASTM D523. Chemical resistance was characterized by exposure to a 10% caustic solution (e.g., 10% aqueous sodium hydroxide or 10% aqueous sulfuric acid) for a predetermined amount of time. Coating flexibility was characterized using a Conical Mandrel tester according to ASTM D522. Solvent resistance was characterized according to ASTM D4752 using acetone. A rating of 1 to 5 was assigned, with 1 indicating poor performance and 5 indicating minimal to no effect observed.

TABLE 1

| Component | Units | E1 |
| --- | --- | --- |
| Epoxidized methyl soyate -TMA adduct | wt % | 49.3 |
| 2-Hydroxyethyl Methacrylate | wt % | 13.5 |
| Epoxidized Vegetable oil | wt % | 36.5 |
| Initiator | wt % | 0.7 |
| Properties | | |
| Brookfield Viscosity, 25° C. | cP | 4500 |
| Brookfield Viscosity, 35° C. | cP | 2100 |
| Solvent resistance (200 double rubs) | | 5 |

TABLE 1-continued

| Component | Units | E1 |
|---|---|---|
| Pencil Hardness | | H-2H |
| Mar resistance | | Pass |
| Gloss (20°/60°/85°) | | 100/125/90 |
| Chemical resistance (10% caustic solution; 40 hrs) | | 5 |
| Mandrel bend | | 1/8" (0.32 cm) |
| Reactivity at ambient temp. | | 7 days TF; clear |

As shown in Table 1, the composition can cure at ambient temperature (e.g., 25° C.), and the mixture became tack free (TF) after one week. At ambient temperature, the viscosity was observed to increase to 17,500 centipoise (cP) measured on a cone plate viscometer at 35° C. after 40 hours before eventually gelling. Careful selection of initiator and catalyst components can shorten the time.

Materials used for the following examples are described in Table 2.

TABLE 2

| Component | Chemical Description |
|---|---|
| UPE-1 | Unsaturated polyester having an acid value of 245-250 |
| UPE-2 | Unsaturated polyester having an acid value of 270-280 |
| UPE-3 | Unsaturated polyester having an acid value of 285-295 |
| PE-1 | Polyester having an acid value of 155-165 |
| PE-2 | Polyester having an acid value of 205-215 |
| UPE/RD-1 | Unsaturated polyester having an acid value of 20 in 2-hydroxyethyl methacrylate (1.4:1 weight ratio), prepared according to Example 2 |
| UPE/RD-2 | Unsaturated polyester having an acid value of 240-250 in butyl hydrogen maleate and 2-hydroxyethyl methacrylate (55-65:5-10:30-40 weight ratio) having a total acid value of 165-175 |
| UPE/RD-3 | Unsaturated polyester having an acid value of 270-280 in butyl hydrogen maleate and 2-hydroxyethyl methacrylate (5-10:0.5-5:1-10 weight ratio), having a total acid value of 160-170 |
| UPE/RD-4 | Unsaturated polyester having an acid value of 160-170 in butyl hydrogen maleate and 2-hydroxyethyl methacrylate (50-60:1-10:30-40 weight ratio) |
| UPE/RD-5 | Unsaturated polyester having an acid value of 135-145 in 2-hydroxyethyl methacrylate (55-65:30-40 weight ratio) |
| UPE/Sty | Unsaturated polyester in styrene, obtained as POLYLITE 32570-01 |
| Acrylic-1 | Carboxyl-functionalized acrylic resin obtained as JONCRYL 848 having an acid value of 225, a Tg of about 65° C. and a molecular weight of about 4500 g/mol |
| Acrylic-2 | A free radically solution polymerized copolymer derived from 40% maleic anhydride, 15% styrene, and 45% butyl acrylate using a peroxide initiator, having an acid value of 430 |
| EVO-1 | Epoxidized vegetable oil having an epoxy equivalent weight of 165-175 |
| EVO-2 | Epoxidized vegetable oil having 2% peroxide initiator (epoxy equivalent weight of 170-180) |
| EML | Epoxidized methyl linseedate having an epoxy equivalent weight of 165-175 |
| eFAME-MA | Reactive diluent having an oxirane content of 0.5%, formed from reaction of an epoxidized fatty acid methyl ester having an oxirane content of 7.1% with the methyl half-ester of maleic acid |
| BHM | Butyl hydrogen maleate, having an acid value of 330-340 |
| HEMA | 2-hydroxyethyl methacrylate |
| Styrene | Styrene, CAS. Reg. No. 100-42-5 |
| DA-1 | Diacrylate obtained as M200 from Miwon Specialty Chemical Company, Ltd. |
| DA-2 | Diacrylate obtained as SR213 from Sartomer |
| Initiator-1 | Peroxy carbonate obtained LUPEROX ™ TBEC |
| Initiator-2 | Peroxy carbonate obtained LUPEROX ™ 101 |
| Catalyst-1 | Phosphonium catalyst |
| Catalyst-2 | 2-Propyl imidizole |
| Anti-foaming agent | Anti-foaming agent obtained as BYK 500 |
| TiO$_2$ | Titanium Dioxide obtained as R-706 |
| Surfactant | Sulfonate surfactant obtained as RHODACAL LDS-22 |
| TMSPMA | 3-(Trimethoxysilyl)propyl methacrylate |
| Acetone | Acetone |
| FG | Fiberglass fabric obtained as 13048D from Rock West Composites |
| CF | Carbon fiber mesh obtained as 13016 from Rock West Composites |
| Quartz-1 | Quartz granules having an average particle size of 1 mm |
| Quartz-2 | Quartz granules having an average particle size of 0.1 to 0.3 mm |
| Quartz-3 | Quartz powder having an average particle size of 25 to 40 micrometers |
| Quartz-4 | Quartz granules having an average particle size of 0.7-1.2 mm |
| Quartz-5 | Quartz granules having an average particle size of 0.25-1 mm |
| Quartz-6 | Quartz granules having an average particle size of 1.2-2.5 mm |

Test methods used in the characterization of the following examples are described in Table 3.

TABLE 3

| Property | Test Method |
|---|---|
| Mar resistance | Fingernail induces mar damage(qualitative) where the back of a fingernail is "flicked--across the coating surface. Any resulting permanent mark from this qualitative analysis is deemed as a failure. Pass: Does not mark or damage; Fail: marks with whitening of surface. |
| Water resistance | Sample was submerged in water for a set period followed by removal of sample and quickly padded dry with an absorbent paper towel. The wt. difference is measured in terms of % water absorbed. |
| Stain resistance | Performed by marking the surface with a Sharpie ™ permanent marker and wiping the stain off after 24 hrs. using isopropyl alcohol |
| Adhesion | ASTM D3359 |
| Pencil Hardness | ASTM D3363 |
| Solvent double rub test | ASTM D4752 (Acetone used instead of methyl ethyl ketone) |
| Gloss | ASTM D523 |
| Chemical resistance: 10% Sulfuric acid or 10% Sodium Hydroxide | ASTM D1308 |
| Flexibility by Conical Mandrel | ASTM D522 |
| Flexibility: T bends | ASTM D4145 : Fail 2T |
| Impact Res. (Direct/Reverse) | ASTM D2794/D5420 |
| Flexural Strength/Flexural Modulus | ASTM D790 |
| Heat Deflection Temperature (HDT) | ASTM 648 |
| Tensile properties | ASTM D412 |
| Adhesion (Lap Shear) | ASTM D 1002 |

Severity Ratings: 5: No effect, 4: slight effect,3: Moderate Effect, 2: Severe effect, 1: Total Failure

Examples 2-7: Curable Compositions

Example 2

A polyester/styrene blend having an acid value of 20 was obtained as POLYLITE 32570-01. Styrene was removed at 50° C. to provide an unsaturated polyester (UPE). The UPE (32 grams (g)) was dissolved in 2-hydroxyethyl methacrylate (HEMA, 22.5 g) to provide UPE/HEMA-1.

UPE/RD-1 (7.5 g) was combined with EVO (2.2 g) and initiator-1 (0.05 g) and cured at 150° C. for 1 hour.

Example 3 eFAME-MA (1.6 g) was combined with a UPE/styrene mixture obtained as POLYLITE 32570-01 (11.4 g) and initiator-1 (0.1 g), cured at 120° C. for 60 minutes, and post-cured at 150° C. for an additional 60 minutes.

Example 4 eFAME-MA (40 g) was combined with $TiO_2$ (25.5 g), and surfactant and antifoaming agent were added. The mixture was mixed at 620 rpm for 2.5 hours, and then allowed to settle.

Example 5

UPE/RD-2 (51.5 g) was combined with $TiO_2$ (23.1 g) and warmed to 40° C. The warmed mixture was mixed at 620 rpm for 45 minutes. Anti-foaming agent was added, followed by 15 minutes of mixing, and then the mixture was allowed to settle.

Example 6

UPE/RD-3 (15.8 g) was combined with EVO (8.3 g) and initiator-1 (0.15 g) allowed to cure at 150° C. for 1 hour.

Example 7

UPE/styrene mixture obtained as POLYLITE 32570-01 (8 g) was combined with initiator-1 (0.06 g) and cured at 120° C. for 1 hour, followed by a post-cure at 150° C. for 1 hour.

The compositions, processing conditions, and properties of Examples 2-7 are summarized in Table 4. Amounts of individual components of the compositions are provided in weight percent based on the total weight of the composition.

TABLE 4

|  | Units | E2 | E3 | E4 | E5 | E6 | E7 |
|---|---|---|---|---|---|---|---|
|  |  | Component |  |  |  |  |  |
| UPE/RD-1 | wt % | 77 |  |  |  |  |  |
| UPE/RD-2 | wt % |  |  |  | 69 |  |  |
| UPE/RD-3 | wt % |  |  |  |  | 65.1 |  |
| EVO | wt % | 22.5 |  |  |  | 34.2 |  |
| UPE/Sty | wt % |  | 87.2 |  |  |  | 99.3 |
| eFAME-MA | wt % |  | 12.2 | 60.4 |  |  |  |
| Initiator-1 | wt % | 0.5 | 0.6 |  |  | 0.6 | 0.7 |
| $TiO_2$ | wt % |  |  | 38.5 | 31 |  |  |

TABLE 4-continued

|  | Units | E2 | E3 | E4 | E5 | E6 | E7 |
|---|---|---|---|---|---|---|---|
| Surfactant | wt % |  |  | 0.8 |  |  |  |
| Anti-foaming agent | wt % |  |  | 0.3 | 0.1 |  |  |
| Pre-cure Properties | | | | | | | |
| Brookfield Viscosity, 25° C. | cP | 900 | 1200 | 1550 | 6800 | 1400 | 1120 |
| Processing | | | | | | | |
| Cure Conditions |  | 150° C. 1 hr | 120° C. 1 hr | — | — | 150° C. 1 hr | 120° C. 1 hr |
| Post Cure |  |  | 150° C. 1 hr | — | — |  | 150° C. 1 hr |
| Cured Properties | | | | | | | |
| Appearance |  | Opaque, tacky | Clear | — | — | Clear | Clear |
| Barcol Hardness |  | — | 45 | — | — | 40+ | 55 |
| Chemical resistance (10% NaOH spot test; 1 hr) |  | Poor | Fair | — | — | Excellent (24 hrs.) | Fair |
| Solvent resistance |  |  |  | — | — | 5 |  |
| Hegman grind |  |  |  | 7 | 7 |  |  |

Samples were cured as cast pucks as well as draw down films on aluminum panels. As shown in Table 3, the cured product according to Example 2 was observed to be opaque and tacky, with a rough surface, suggesting poor compatibility of the components. Thus when an epoxidized oil is used with a polyester having a low acid value, poor film characteristics and properties of the cured products are obtained. Example 3 provided clear films having good hardness, indicating that bio-based reactive diluents can be used with low acid value unsaturated polyesters. The resulting products of Examples 4 and 5 were flowable and showed good pigment grind and no sedimentation after 30 days, suggesting that the carboxyl functional resin and the diluent can provide good pigment dispersibility. Thus, the reactive diluent as well as the high carboxyl functional polyester was shown to be useful as a pigment or colorant dispersing aid/vehicle. In an aspect, E4 or E5 type formulations can be used in combination with but not limited to other dispersing agents like DISPERBYK 2152, commercially available from BYK, as well as other wetting agents and surfactants. Diluents like eFAME-MA are non-volatile liquids are reactive with other vinyl monomers, and can effectively act as reactive dispersing aids or medium for pigments in addition to becoming an integral part of the backbone and also improve certain mechanical properties.

The visual appearance, or "clarity" of the cured samples was also assessed, as shown in Table 4. The term "clarity" of a sample signifies how well objects are seen when viewed through the sample. It will be understood that depending on the compatibility, reactivity, and solubility of the various components, the composition can produce a haze. Incompatibility can occur in the final cured system which can result in an opaque sample due to heterogeneous regions. When these regions are in the range of visible light causing significant reflection, refraction and light scattering, it results in loss of clarity. However, if these regions are smaller than the wavelength of light, the cured composition appears visually clear (i.e., to the unaided human eye). As seen in Table 4, when EVO was used with low acid value unsaturated polyester (i.e., as in E2) the resulting cured compositions exhibited poor compatibility resulting in an opaque composition. Compatibility was found to be improved by modification of the epoxidized oil with unsaturated copolymerizable moieties resulting in more compatible and uniform cured matrix even when a low acid value UPE was used (i.e., as in E3). In contrast to low acid value UPE, the higher acid value polyester showed better compatibility with EVO whether saturated or unsaturated and also gave better performance (i.e., as in E6).

Example 8: Copolymerization of Reactive Diluent by Emulsion Polymerization

The reactive diluent of Table 2 having an oxirane content of 0.5%, formed from reaction of an epoxidized fatty acid methyl ester having an oxirane content of 7.1% with the methyl half-ester of maleic acid was further examined for its utility in emulsion polymerization. The unsaturated, epoxidized vegetable oil derivative ("eFAME-MA") can be copolymerized with various comonomers, for example including (but not limited to) styrene, methyl (meth)acrylate, butyl (meth)acrylate, (meth)acrylic acid, acrylonitrile, hydroxyl ethyl (meth)acrylate and its derivatives, vinyl monomers (e.g., vinyl acetate or vinyl alcohol), and acetone diacrylamide.

Emulsion polymerization can be carried out by various techniques which are generally known. A general emulsion polymerization follows. A mixture of monomers were polymerized in the presence of a surfactant as an emulsion stabilizer and a water soluble initiator/redox initiator at a temperature of 40 to 90° C. in an aqueous dispersion medium. A small amount of monomer was pre-emulsified to form a micelle that was initiated to form a seed particle. The monomer mixture and initiator were added to the seed to further polymerize into a latex emulsion. The reaction was continued until no free monomer was observed, for example by gas chromatography or more broadly by comparing the theoretical nonvolatiles on completion with experimentally observed. T-butyl hydroperoxide can be used to scavenge residual unreacted monomer.

Accordingly, water (20 g) was charged in a reaction flask fitted with a thermocouple and a mechanical agitator. A sulfonate surfactant obtained as RHODACAL LDS-22 was used. A pre-emulsion ("$f_m$") of the monomer, the diluent, water and surfactant was prepared and kept under constant agitation. An initiator solution ("$f_i$") was made using potassium persulfate. A seed was made by adding particular amounts of the pre-emulsion and the initiator solution into a flask containing water and surfactant at 80° C. After the formation of the seed polymer emulsion, the feeds $f_i$ and $f_m$ were added to the flask over 2.5 hours to allow the seed to grow and further polymerize. After the addition was complete the reaction was held at 80° C. for 1 hour. Residual monomer was scavenged using a solution of t-butyl hydroperoxide and ascorbic acid.

Emulsion polymerization compositions and results are summarized in Table 5.

TABLE 5

| Example 8 | $f_{flask}$ | $f_i$ | $f_m$ | % |
|---|---|---|---|---|
| Butyl Acrylate | | | 3.0 | 20.5% |
| Styrene | | | 9.0 | 61.6% |
| Acrylic Acid | | | 0.0.3 | 2.0% |
| eFAME-MA | | | 2.3 | 15.7% |
| Total monomer | | | 14.6 | 100% |
| Surfactant | 0.2 | | 0.4 | 0.9% |
| Potassium persulfate | | 0.2 | | 1.3% |
| DI water | 20 | 4.0 | 6.0 | |
| % NV (% non-volatiles) | | | | 32% |
| Scrap (% coagulum) | | | | 4% |

Accordingly, the diluent can act as a bound coalescing aid for latex and paint formulations in architectural and industrial coatings, thereby reducing the need for VOC coalescing agents. It also adds bio-based content to the product. Existing ingredients tend to soften the product and can leach out of the coalesced film over time compromising block, stain, scrub resistance as well as hardness. The reactive diluent described herein, being an integral part of the latex polymer backbone, can enhance properties over known coalescing aids. The ability to soften the latex copolymer can extend its use as bio-based latexes for coatings or providing tack for adhesive applications.

Examples 9-13: Coating Applications

In surface coatings applications such as coil coatings, resin is dissolved in an inert solvent and a thin coating is applied to the surface of a metal substrate which is uncoiled during the application and passed through a series of ovens then cured at high temperature ranging from 150 to 250° C. for very short periods in a continuous operation. Dry film thickness is usually less than 1 mil. Fast cure, flexibility, adhesion to the metal surface, and durability represent some of the key requirements for materials for coating applications. Using reactive diluents that have low or no volatility and high reactivity could therefore be an advantage due to low or no use of solvent. Styrene-containing materials are not desirable as styrene is too volatile. Currently, coil coatings use solvents in amounts of up to 40-45% which are volatilized when passed through the oven. Furthermore, existing resin systems include formaldehyde-based curing systems which react with hydroxyl functional resins and release volatile, flammable biproducts. The volatile solvent and reaction products have to be captured and incinerated.

Low viscosity derivatives of epoxidized oils can be considered as nonvolatile diluents, and can impart good reactivity with high carboxyl content functionalized polyesters. They have good cutting power and along with epoxidized oils effectively lower the solution viscosity and can have good crosslink density as well as high flexibility, and thus may be advantageous for coil and can coating applications. High carboxyl content functionalized polyesters and acrylics along with epoxidized oils and low volatility reactive diluents can therefore provide a path towards low-to-no VOC baked liquid coatings. Suitable carboxyl functionalized resins can include polyesters or acrylic copolymers of suitable glass transition temperature (Tg) and molecular weight.

eFAME-MA can be blended with castor oil and reacted in the presence of polyisocyanate. For example, isophorone diisocyanate (3.7 g), Castor oil (3.7 g), eFAME-MA (3.8 g), dibutyltin dilaurate (0.4 g), and BYK 500 (0.2 g) were added and mixed to pre-react at 75° C. for 20 minutes. The mixture was then applied as a film on a 5×15 cm. aluminum panel and cured at 75° C. for 2 hours in an oven. The tack free film was tested for alkali resistance (10% sodium hydroxide for 24 hours and 100 acetone double rubs. Both tests registered no blemish (score:5.0).

Automotive coatings generally use hydroxyl functionalized acrylic resins which are crosslinked with amino-containing resins under heat curing cycles. The chemistry releases volatile byproducts along with the volatile solvent used as a carrier. This solvent must be captured or incinerated. Other chemistries used in the industry are glycidyl epoxy-based acrylics dissolved in volatile solvents that are heat cured with $C_{12}$-diacids. Other existing chemistries use polyurethanes which also use large amounts of inert solvents for application.

The use of bio based epoxidized oil as an aliphatic liquid that can be reacted with carboxyl functionalized resin in presence of a reactive diluent with low volatility can greatly reduce emissions can be explored.

Accordingly, the use of the compositions of the present disclosure for coating applications was explored. Table 6 shows an exemplary composition and the associated properties for use of the composition in a coil coating application.

TABLE 6

| Component | Units | E9 |
|---|---|---|
| UPE-1 | wt % | 31.8 |
| eFAME-MA | wt % | 19.1 |
| DA-1 | wt % | 22.3 |
| Catalyst | wt % | 0.6 |
| EVO-1 | wt % | 25.5 |
| Initiator-1 | wt % | 0.6 |
| Pre-cured properties | | |
| Brookfield Viscosity | cP | 2120 |
| Cure Conditions | | 200° C./8 min. |
| Film thickness | μm | 25-65 |
| Final Properties | | Results |
| Pencil hardness | | H |
| Solvent resistance | 100+ Double rubs | 4.9 |
| Stain Resistance | | 5.0 |
| T bend | | 2T |
| Cross hatch adhesion | | 5B |

Accordingly, as shown in Table 6, when a polyester resin with a high acid value (e.g., of 248) was formulated with an unsaturated bio-based reactive diluent derived from epoxidized fatty acid methyl ester along with a high boiling point multifunctional diacrylate and cured at high temperature, coatings with good flexibility (2T) and hardness (H) as well as stain resistance and solvent resistance were obtained. In an aspect, the UPE-1 resin and EVO-1 can be replaced by a vinyl ester resin using low amounts non-HAP solvents. The bio-based content could be provided by the use of eFAME-MA or similar compounds.

Examples 10-16: Composites

The compositions described herein are useful as a binder compositions or as gel coats for composite materials, for example, for stone composites.

Examples 10-13 in Table 7 show coating formulations on an aluminum panel, as well as puck casts in some cases (for testing Barcol hardness) and the associated properties. These examples exemplify the performance characteristics of the binder formulations. All samples were clear in appearance after curing. The formulations also exhibit long pot life. In an aspect, E11 had initial Brookfield viscosity of 1400 cP at 25° C. and 700 cP at 35° C. After 16 hours, the viscosity was 2,750 cP at 25° C. and 2,000 cP at 35° C. making such formulations suitable for composite applications.

nents within the composition. The hardness and the mar resistance of the products demonstrate how the chemistry of the softer components (i.e., the highly functionalized epoxidized oil) works well with the higher Tg carboxyl functionalized resin to give a dense thermoset network unaffected by acids, chemical solvents, or stains. The properties of the stone composites are quite robust, exhibiting high mechanical strength. The low water absorption in the samples (e.g., <0.1%) suggest low porosity after cure and also point towards the hydrophobic nature of the oil component. The high impact resistance is particularly important as stone composites with styrene-based UPE tend to be more brittle. While the present exemplary formulations did not contain silane coupling agents, these additives can enhance the performance of the composite and are therefore contemplated by the present disclosure.

The composites according to examples 14 and 15 were formed according to the following general procedure. A dispersion of titanium dioxide (40% by weight) was pre-

TABLE 7

| Component | Units | E10 | E11 | E12 | E13 |
|---|---|---|---|---|---|
| UPE-1 | wt % | 50.5 | | | |
| UPE-2 | wt % | | 35 | | |
| Acrylic-1 | wt % | | | 28 | |
| Acrylic-2 | wt % | | | | 29.8 |
| DA-2 | wt % | 9.0 | | | |
| Catalyst | wt % | | | 0.7 | |
| EVO-1 | wt % | 39.7 | 34.3 | | |
| EVO-2 | wt % | | | 35.4 | 32.1 |
| BHM | wt % | | 3.3 | 14.2 | 8.3 |
| HEMA | wt % | | 26.7 | 21.2 | 29.8 |
| Initiator-1 | wt % | 0.5 | 0.6 | | |
| Anti-foaming agent | wt % | 0.3 | | 0.1 | |
| Cure Conditions | | 150° C./1 hour | 150° C./1 hour | 150° C./1 hour PC: 160° C./ 20 min | 150° C./1 hour |
| Pencil hardness | | | | | 2-3H |
| Solvent resistance | | 5 | 5 | 5 | 5 |
| Stain Resistance (Double rubs) | 100+ | 5 | | 5 | 5 |
| Cross hatch adhesion | | 5 | 5 | 5 | 5 |
| Gloss: 20°/60°/85° | | 97/135/90 | 115/150/95 | 110/150/95 | 107/143/93 |
| Chemical resistance (10% NaOH, 24 hours) | | 4.7 | 4.95 | 4.8 | 1 |
| Chemical resistance (10% H$_2$SO$_4$, 24 hrs) | | 5 | 5 | 5 | 5 |
| Barcol Hardness | | 50-55 | 40 | — | — |
| Mar resistance | | 5 | 5 | 5 | 3 |
| Impact resistance: Dir/Rev | in-lbs/ (Joules) | | | 90/90 (10.1/10.1) | |

In stone composites, the granules and powder of the filler e.g., quartz, are mixed with low viscosity resin (e.g., 500-3000 cP) to wet the quartz. Silane coupling agents can be used as adhesion promoters to the filler. The product is then vibro-compressed under vacuum conditions for 90 seconds before curing the slab. Flexural strength, water, stain and chemical, abrasion resistance, impact resistance, and hardness, are important characteristics. Examples 14-16 demonstrate the properties as a binder and in a composite. As a binder, it can be seen that the curing chemistry can occur even in the absence of a catalyst. The high acid value of the resin is believed to catalyze the reaction. The curing provides a highly crosslinked network as demonstrated by resistance to acetone. The resistance to alkali demonstrates the reactivity of the acid groups with the epoxy groups during the curing process. The high gloss and clarity of the films demonstrate the compatibility of the various compopared by mixing TiO$_2$ in EVO under high speed for 30 minutes. Quartz granules and powder were heated to 50° C. The titanium dioxide dispersion was added to the quartz under constant agitation followed by addition of the reactive diluent, DA, and the initiator. Finally, UPE in the form of a pulverized powder was added. The mixture was mixed to a cookie dough consistency, and the warm mixture was transferred to a silicone mold and spread using a roller warmed to maintain a temperature of about 50° C. The filled mold was subjected to vibro-compression. A lid was placed on the mold with a 2 kilogram weight, and the sample was cured at 150° C. for 1 hour.

The composite according to example 16 was formed according to the following general procedure. Quartz granules and powder and the titanium dioxide with EVO and the peroxide initiator were mixed for 5 minutes. The UPE/RD-4 mixture was added, and uniformly mixed. The mixed product was transferred to a silicone mold and warmed to 35° C. The mold was subjected to vibro-compression followed by pressing between heated platen of a hydraulic press. A pressure of 4 T was applied, followed by curing at 150° C. for 60 minutes. The sample was removed from the mold and cut uniformly for testing.

Compositions and properties are summarized in Table 8. The amount of each component is given in weight percent based on the total weight of the composition. The properties were determined as described previously.

TABLE 8

| Component | Units | E14 | E15 | E16 |
|---|---|---|---|---|
| UPE-1 | wt % | 4.45 | | |
| UPE-2 | wt % | | 2.96 | |
| DA-2 | wt % | 0.79 | | |
| EVO-1 | wt % | 3.49 | 3.31 | |
| EVO-2 | wt % | | | 2.93 |
| BHM | wt % | | 0.64 | |
| UPE/RD-4 | wt % | | | 5.47 |
| HEMA | wt % | | 1.94 | |
| TiO$_2$ | wt % | 0.96 | 0.83 | 0.86 |
| Quartz-1 | wt % | 46.52 | | |
| Quartz-2 | wt % | 19.16 | | 19.15 |
| Quartz-3 | wt % | 24.63 | 24.96 | 25.08 |
| Quartz-4 | wt % | | 46.3 | 19.15 |
| Quartz-5 | wt % | | 19.06 | |
| Quartz-6 | wt % | | | 27.36 |
| Cure Conditions | | 150° C./50 min | 150° C./50 min | 150° C./60 min |
| Binder % | wt % | 8.73 | 8.85 | 8.4 |
| Barcol Hardness | | 81 | 81 | 80 |
| Final density | g/cm$^3$ | 2.27 | 2.32 | 2.38 |
| Gardner impact | in-lbs | >160 | >160 | >160 |
| Water absorption (24 hours) | % | <0.01% | 0.1% | 0% |
| Flexural Strength | MPa | 71.7 | 53.1 | 52 |
| Flexural Modulus | MPa | 4944 | 4137 | 4592 |
| HDT | ° C. | | 249 | 251 |

Example 17: Fiber Reinforced Composites

Fiber reinforced composites are materials made from fiber that acts as a reinforcer and a polymer resin matrix. The fiber imparts strength and stiffness while the polymer bonds the fibers. In a cured part, the polymer matrix transfers the applied loads to the reinforcing fibers and protects the fibers from environmental attack. Fiber reinforced composites offer several advantages compared to traditional materials like metals, including for example, light weight, high strength, durability, design flexibility, and thermal conductivity. These parts can be used in architectural and construction applications, marine applications, aerospace applications, automotive applications and transportation applications. Some of the fabrication processes involved can include casting, layup, spray up, resin transfer molding, pultrusion, press molding and continuous panel.

As shown in previous examples, the compositions disclosed herein can provide excellent adhesion, low water absorption, and good chemical resistance. Glass and carbon fiber composite samples were prepared made using hand layup in a mold cavity. It can be seen from the examples that the tensile strength improves with increasing fiber content in the composite.

Fiber reinforced composites were prepared according to the following general procedure. A first solution was prepared by warming the polyester resin (45 g) to 40° C. EVO (24.1 g) including 2 wt % of a peroxide initiator and an anti-foaming agent was added. The mixture was mixed for 10 minutes. A second solution was prepared by diluting silane (0.5 g) in acetone (1.5 g). An oven was preheated to 125° C. Fiber glass fabric obtained as 13048D from Rock West Composites or a carbon fiber mesh were prepared by brushing the second solution onto the fabric and allowing to dry. The mesh was placed in a 5×5×0.05 inch open cavity mold. The mixture precursor A was then poured in the mold to uniformly soak into the fabric, and the sample was cured at 125° C. for 30 min. and post cured at 140° C. for 1 hr. Samples having a size of 10×2.5 centimeters were cut for property testing.

Fiber reinforced composites and properties are summarized in Table 9. The amount of each component of precursor mixture A is given in weight percent based on the total weight of UPE/RD-4 and EVO-2 in the precursor mixture A, and the amount of each component of precursor mixture B is given in weight percent based on the total weight of TMSPMA and acetone in precursor mixture B. Anti-foaming agent was included in each composition in an amount of about 0.4 weight percent, based on the total weight of UPE/RD-4, EVO-2.

TABLE 9

| Component | Unit | E17 | E18 | E19 |
|---|---|---|---|---|
| Precursor mixture A | | | | |
| UPE/RD-4 | wt % | 65.6 | 65.6 | 65.6 |
| EVO-2 | wt % | 34.4 | 34.4 | 34.4 |
| Precursor mixture B | | | | |
| TMSPMA | wt % | 25 | 25 | 25 |
| Acetone | wt % | 75 | 75 | 75 |
| Composite | | | | |
| FG | wt % | 24 | 39 | |
| CF | wt % | | | 25 |
| Processing | | | | |
| Cure | | 125° C., 30 minutes | 125° C., 30 minutes | 125° C., 30 minutes |
| Post-cure | | 140° C., 60 minutes | 140° C., 60 minutes | 140° C., 60 minutes |
| Composite Properties | | | | |
| Ultimate Strength | MPa | 77.6 | 95.8 | 87.6 |
| % elongation | % | 4.1 | 1.7 | 4.2 |
| Tangent Modulus | MPa | 9,894 | 12,308 | 23,441 |

Examples 20-23: Elastomer Formulations

Elastomers are polymers with viscoelasticity and weak intermolecular forces. They can be deformed under limited stress but can regain their form when the stress is released. Their properties depend, for example, on the polymer backbone, intermolecular forces, and glass transition temperature (Tg). Common exemplary elastomers include polyurethanes and butadiene rubbers.

The composition described herein has hard domains (e.g., from the higher Tg polyester) and soft domains (e.g., from the low Tg epoxidized oil). The reactive diluent can facilitate the processing of the composition. By varying the composition it is possible to make hard or soft elastomers. For example, an elastomer was fabricated by mixing 20 grams of EVO-1 with 10 grams of butyl hydrogen maleate. The mixture was poured in a 5×5×0.1" mold and cured at 125° C. for 1 hour and 140° C. post cure for 1 hour. The sample was cooled to 25° C. The resulting elastomer had a soft feel to touch and self-healing capabilities with elongation greater than 100%. When immersed in water for 64 hours, the water absorption for a 12 gram sample was less than 0.1% suggesting excellent water resistance properties.

Elastomer compositions were also prepared according to the following general procedure. For examples 20 and 21, the resin was heated to 80° C. before mixing with other ingredients. For examples 22 and 23, all components were added simultaneously. The mixtures were poured in a 5×5×0.1 inch (5.1×5.1×0.25 cm) cavity mold in the oven and then heat cured followed by post curing. The samples were cut into dumbbells and tested on for mechanical properties.

Elastomer compositions and properties are described in Table 10. The amount of each component is provided in weight percent based on the total weight of the elastomer composition.

TABLE 10

| Component | Units | E20 | E21 | E22 | E23 |
|---|---|---|---|---|---|
| PE-1 | wt % | 65.9 | | | |
| PE-2 | wt % | | 59.4 | | |
| UPE/RD-4 | wt % | | | 65.4 | |
| UPE/RD-5 | wt % | | | | 48.4 |
| eFAME-MA | wt % | | | | 24.2 |
| EVO-1 | wt % | 33.6 | 33.7 | | |
| EVO-2 | wt % | | | 34.2 | 23.8 |
| EML | wt % | | 5.9 | | |
| HEMA | wt % | | | | 2.4 |
| Catalyst-1 | wt % | | 1.0 | | 0.8 |
| Catalyst-2 | wt % | 0.4 | | | |
| Anti-foaming agent | wt % | | 0.6 | 0.4 | 0.4 |
| Cure Conditions | | 155° C./60 min | 150° C./60 min | 125° C./30 min. PC:140° C./60 min | 125° C./ 1 hr PC:140° C./50 min |
| Properties | | | | | |
| Shore D hardness | | 18 | 5 | 78 | 49 |
| Tensile Strength | MPa | 1.76 | 0.6 | 27.1 | 8.5 |
| Elastic Modulus | MPa | 1.9 | 0.35 | 451 | 35.4 |
| Elongation | % | 211 | 208 | 39 | 75 |

As shown in Table 12, examples 20 and 21 exhibited self-healing characteristics where the elastomer can recover after a sharp indenting force is applied. Deep fingernail marks recover completely with no blemishes. Examples 20 and 21 seem to show such self-healing capabilities with low Shore D hardness and higher elasticity. In contrast, example 22 was observed to be very stiff and tough with a very high elastic modulus likely due to higher crosslinking. Example 22 further exhibited improved solvent and chemical resistance. Addition of eFAME-MA in example 23 was observed to reduce the stiffness and hardness due to the higher level of longer carbon chains in the elastomer.

Adhesive Formulations

Epoxies can adhere to a variety of substrate like glass, quartz, concrete or metal. The biobased compositions of the present disclosure having higher acid value carboxyl functional resins in combination with epoxidized vegetable oil and a reactive diluent can be used, for example, in electronics or structural adhesives. The formulation can be modified or formulated for hard or soft adhesives and can be tested for lap shear or peel strength. Urethane groups can also add adhesive strength from hydrogen bonding and other modifiers can be used to increase performance.

Example 24

On end surfaces (1×1 inch) of pair of clean smooth aluminum coupons (4×1×1 inch), 25% TMSPMA solution in acetone was coated and allowed to flash dry, followed by application of a composition including UPE/RD-4 and EVO-1 on one coupon. Fine quartz powder having an average particle size of 0.1-0.3 millimeters was sprinkled on the surface including UPE/RD-4 and EVO-1, and the second coupon was placed adjacent to the first coupon, and clipped into place with the adhesive areas in contact. The sample was cured at 125° C. for 1 hour followed by post-curing at 140° C. for 1 hour.

Example 25

The procedure of Example 24 was repeated except the silane coating was omitted.

Example 26

A stone composite (2.5×0.5×0.5 inches) was prepared according to example E14 in Table 8. The sample was broken by applying flexural load in the center. The broken interface was coated with a silane solution (3-(trimethoxysilyl)propyl methacrylate in acetone), followed by application of UPE/RD-4 and EVO-1 at the interface. The pieces were joined and held together with a c-clamp and cured at 125° C. for 1 hour followed by post curing (PC) at 140° C. for 1 hour. Samples were tested under load using an Instron™ tensile tester.

Table 11 shows preliminary testing results for lap shear and butt adhesion. Lap shear testing performed by method ASTM D1002.

TABLE 11

| | Lap Shear strength (MPa) | Butt Adhesion (MPa) | Failure Mode |
|---|---|---|---|
| E24 | 16.1 | | Cohesive/Adhesive |
| E25 | 18.7 | | Cohesive/Adhesive |
| E26 | | 16.5 | Substrate failure |

Examples 27-28: Binder Compositions Including Styrene

Binder compositions including styrene in amounts up to 14 weight percent have been shown to exhibit a desirable combination of properties. In Example 27, UPE-3 (4.5 g) was combined with BHM (1.0 g) and styrene (1.7 g), and mixed uniformly for 5 minutes. EVO-2 (5.4 g) was then added to the resin solution along with initiator-2 (0.1 g). After mixing for 5 minutes and allowing the air to dissipate, the liquid solution was applied to an aluminum panel. The panel was cured at 150° C. for 50 minutes and tested for various properties. In Example 28, UPE-1 (7.1 g) was combined with BHM (1.6 g), styrene (2 g), HEMA (1.5 g) and catalyst-1 (0.06 g) and mixed uniformly for 5 minutes. EVO-2 (7.6 g) containing 0.2% of initiator-2 was then added to the resin solution. After mixing for 5 minutes and allowing the air to dissipate the liquid solution was applied to an aluminum panel and poured into a pan to make a puck. The panel and puck were cured at 140° C. for 40 minutes and tested for various properties.

Exemplary formulations and properties are shown in Table 12.

TABLE 12

| Component | Units | E27 | E28 |
|---|---|---|---|
| UPE-3 | wt % | 35.4 | — |
| UPE-1 | wt % | — | 35.7 |
| BHM | wt % | 7.9 | 8.0 |
| Styrene | wt % | 13.4 | 10.1 |
| HEMA | wt % | — | 7.6 |
| EVO-2 | wt % | 42.5 | 38.2 |
| Initiator-2 | wt % | 0.8 | 0.08 |
| Catalyst-1 | wt % | — | 0.3 |
| Brookfield Viscosity, 25° C. | cP | 3800 | 2780 |
| Brookfield Viscosity, 35° C. | cP | — | 1330 |
| Brookfield Viscosity, 40° C. | cP | 1230 | — |
| Formulated Viscosity, 2 hours, 25° C. | cP | | 3000 |
| Cure Conditions | ° C./minutes | 150° C./50 min | 140° C./40 min |
| Properties | | | |
| Visual Appearance | | clear | clear |
| ADR 100+ | | 5.0 | 5.0 |
| Mar Resistance | | 5.0 | 5.0 |
| Chemical resistance (10% NaOH, 24 hours) | | 5.0 | 4.8* |
| Barcol Hardness | | — | 30-50 |

*Surface gloss loss

Examples 29-30: Asphalt Compositions

Example 29 eFAME-MA (20 g) was taken in the presence of tert-dodecane thiol (0.05 g) and of Luperox DTA (0.4 g) as initiator was reacted with styrene (4 g) at 115-125° C. for 105 minutes. Maleic anhydride (0.1 g) and epoxidized fatty acid methyl ester (0.3 g) was then added and the reaction was continued for an additional 135 minutes at 130° C. The reacted product was a liquid with a viscosity of 27,850 cP at 25° C. The free carboxylic groups can be neutralized with a base like n-dimethylethanolamine and can be dispersed in water. For water-based applications, higher molecular weight polymers can be synthesized through emulsion polymerization as stated in example 8.

Example 30

The process according to Example 29 was repeated except the epoxidized methyl ester was replaced with epoxidized oil wherein 22.6 g of the partially maleated oil was reacted with 1.2 g of styrene, 0.02 g of tert-dodecane thiol and 0.3 g of Luperox DTA at 110-115° C. for 140 minutes to yield a product with viscosity of 49,050 cP at 30° C.

A significant improvement is therefore provided by the binder compositions of the present disclosure.

This disclosure further encompasses the following non-limiting aspects.

Aspect 1: A binder composition comprising: an epoxidized vegetable oil or a derivative thereof having an epoxy group content of 1 to 12 weight percent, based on the total weight of the epoxidized vegetable oil; and a carboxyl-functionalized resin; and a liquid reactive diluent; wherein a combined acid value of the carboxyl-functionalized resin and the liquid reactive diluent is 50 to 500.

Aspect 2: The binder composition of aspect 1, wherein the epoxidized vegetable oil comprises a fatty acid ester comprising $C_{5-26}$ alkyl groups.

Aspect 3: The binder composition of aspect 1 or claim 2, wherein the epoxidized vegetable oil is derived from a vegetable or plant-based oil.

Aspect 4: The binder composition of any of aspects 1 to 3, wherein the epoxidized vegetable oil is present in the curable composition in an amount of greater than 0 to less than or equal to 65 weight percent, or 10 to 50 weight percent, or 15 to 50 weight percent, or 20 to 50 weight percent, or 20 to 45 weight percent, each based on the total weight of the binder composition.

Aspect 5: The binder composition of any of aspects 1 to 4, wherein the carboxyl-functionalized resin comprises a carboxyl-acid functionalized polymer, a carboxyl-functionalized oligomer, or a combination thereof.

Aspect 6: The binder composition of any of aspects 1 to 5, wherein the carboxyl-functionalized resin comprises a polyester, an acrylic polymer, or a combination thereof.

Aspect 7: The binder composition of any of aspects 1 to 6, wherein the carboxyl-functionalized resin comprises a polyester.

Aspect 8: The binder composition of aspect 7, wherein the polyester is an unsaturated polyester having a number average molecular weight of 250 to 5,000 Daltons.

Aspect 9: The binder composition of aspect 7 or 8, wherein the polyester is a cyclopentadiene-modified polyester.

Aspect 10: The binder composition of any of aspects 1 to 9, wherein the carboxyl-functionalized resin is dissolved or homogenously dispersed in the liquid reactive diluent at 25° C.

Aspect 11: The binder composition of any of aspects 1 to 10, wherein the carboxyl-functionalized resin has an acid value of greater than or equal to 50, or 50 to 500, or 50 to 300, or 100 to 300, or 200 to 300.

Aspect 12: The binder composition of any of aspects 1 to 11, wherein the carboxyl-functionalized resin comprises an acrylic polymer.

Aspect 13: The binder composition of aspect 12, wherein the acrylic polymer has a number average molecular weight of 500 to 25,000 grams per mole and comprises pendant anhydride groups.

Aspect 14: The binder composition of any of aspects 1 to 13, wherein the carboxyl-functionalized resin is present in the curable composition in an amount of greater than 0 to 65 weight percent, or 3 to 50 weight percent, or 5 to 45 weight percent, or 10 to 40 weight percent, each based on the total weight of the binder composition.

Aspect 15: The binder composition of any of aspects 1 to 14, wherein the liquid reactive diluent comprises an ethylenically unsaturated group, an oxirane group, a carboxyl group, a hydroxyl group, or a combination thereof.

Aspect 16: The binder composition of any of aspects 1 to 15, wherein the liquid reactive diluent comprises a hydroxyl-functionalized $C_{1-12}$ alkyl (meth)acrylate.

Aspect 17: The binder composition of any of aspects 1 to 16, wherein the liquid reactive diluent comprises 2-hydroxyethyl methacrylate.

Aspect 18: The binder composition of any of aspects 1 to 17, wherein the liquid reactive diluent comprises a ($C_{1-8}$ hydrocarbyl) hydrogen maleate, a bis($C_{1-8}$ hydrocarbyl) maleate, or a combination thereof.

Aspect 19: The binder composition of any of aspects 1 to 18, wherein the liquid reactive diluent comprises an ethylenically unsaturated group and is derived from vegetable oil.

Aspect 20: The binder composition of any of aspects 1 to 19, wherein the liquid reactive diluent is a transesterification reaction product of an epoxidized fatty acid methyl ester and a vinyl compound having pendant hydroxyl groups or a $C_{1-8}$ alkyl half-ester of maleic acid, for example a methyl half-ester of maleic acid.

Aspect 21: The binder composition of any of aspects 1 to 20, wherein the liquid reactive diluent comprises an esterified epoxidized vegetable oil derivative having a number average molecular weight of 950 grams per mole or less, or 650 grams per mole or less.

Aspect 22: The binder composition of any of aspects 1 to 21, wherein the liquid reactive diluent comprises a mono-, di-, or poly-functional acrylate ester or is derived from and unsaturated anhydride or polyacid.

Aspect 23: The binder composition of any of aspects 1 to 22, wherein the liquid reactive diluent comprises an anhydride that is partially or fully esterified with a monohydric alcohol, a hydroxy-functionalized vinyl ester, a fatty acid ester of an epoxidized oil, or a combination thereof, wherein the liquid reactive diluent has a number average molecular weight of 950 grams per mole or less, or 650 grams per mole or less.

Aspect 24: The binder composition of any of aspects 1 to 23, wherein the liquid reactive diluent is present in an amount of greater than 0 to 75 weight percent, or 5 to 50 weight percent, or 5 to 40 weight percent, or 10 to 40 weight percent, or 20 to 40 weight percent, each based on the total weight of the binder composition.

Aspect 25: The binder composition of any of aspects 1 to 24, comprising 3 weight percent or less of residual unreacted anhydride groups, based on the total weight of the carboxyl-functionalized resin and the liquid reactive diluent.

Aspect 26: The binder composition of any of aspects 1 to 25, wherein a stoichiometric ratio of epoxy groups to carboxyl groups is 0.85:1 to 1.5:1.

Aspect 27: The binder composition of aspect 1, comprising: 5 to 65 weight percent of the epoxidized vegetable oil or a derivative; and 3 to 50 weight percent of the carboxyl-functionalized resin; and 5 to 50 weight percent of the liquid reactive diluent; wherein the carboxyl-functionalized resin comprises a polyester, an acrylic polymer, or a combination thereof; wherein the liquid reactive diluent comprises a hydroxyl-functionalized $C_{1-12}$ alkyl (meth)acrylate, a ($C_{1-8}$ hydrocarbyl) hydrogen maleate, a bis($C_{1-8}$ hydrocarbyl) maleate, a transesterification reaction product of an epoxidized fatty acid methyl ester and a vinyl compound having pendant hydroxyl groups, or a combination thereof; wherein the combined acid value of the carboxyl-functionalized resin and the liquid reactive diluent is 100 to 500.

Aspect 28: A method for the manufacture of the binder composition of any of aspects 1 to 27, the method comprising combining the components of the composition.

Aspect 29: The method of aspect 28, wherein combining the components of the composition comprises: combining 30 to 95 weight percent of a liquid reactive diluent comprising an anhydride that is partially or fully esterified with a monohydric $C_{1-6}$ alcohol, a hydroxy-functionalized vinyl ester, a fatty acid ester of an epoxidized oil, or a combination thereof, wherein the liquid reactive diluent has a number average molecular weight of 1000 grams per mole or less, or a number average molecular weight of 950 grams per mole or less, or 650 grams per mole or less; and 5 to 70 weight percent of a colorant; to provide a concentrate, wherein weight percent is based on the total weight of the concentrate; and combining the concentrate with the epoxidized vegetable oil or a derivative thereof and the carboxyl-functionalized resin to provide the binder composition.

Aspect 30: A composition comprising a cured product derived from the binder composition of any of aspects 1 to 27.

Aspect 31: A composite comprising: a binder derived from a binder composition comprising: an epoxidized vegetable oil or a derivative there of having an epoxy group content of 1 to 12 weight percent, based on the total weight of the epoxidized vegetable oil; and a carboxyl-functionalized resin; and a liquid reactive diluent; wherein a combined acid value of the carboxyl-functionalized resin and the liquid reactive diluent is 50 to 500; and a reinforcing agent.

Aspect 32: The composite of aspect 31, wherein the reinforcing agent comprises a mineral filler, preferably comprising quartz, glass, titanium dioxide, silica, marble chips.

Aspect 33: The composite of any of aspects 31 or 32, comprising: 1 to 80 weight percent, or 3 to 15 weight percent, or 5 to 10 weight percent of the binder; and 20 to 99 weight percent, or 85 to 97 weight percent, or 90 to 95 weight percent of the reinforcing agent; wherein weight percent is based on the total weight of the composite.

Aspect 34: The composite of aspect 31, wherein the reinforcing agent comprises a fibrous material, preferably glass fibers or carbon fibers.

Aspect 35: The composite of any of aspects 31 to 34, further comprising an additive composition, preferably wherein the additive composition comprises a colorant.

Aspect 36: The composite of any of aspects 31 or 34 to 35, comprising: 25 to 75 weight percent, or 55 to 75 weight percent of the binder; and 25 to 75 weight percent, or 20 to 45 weight percent of the reinforcing agent; wherein weight percent is based on the total weight of the composite.

Aspect 37: A method of preparing a composite, the method comprising curing the binder composition of any of aspects 1 to 27 in the presence of a reinforcing agent to provide the composite.

Aspect 38: The method of aspect 37, wherein curing the binder composition comprises heating the binder composition to a temperature of 20 to 250° C., optionally in the presence of an initiator, a catalyst, or both.

Aspect 39: The method of aspect 37 or 38, further comprising preheating the binder composition to a temperature of 20 to 75° C.

Aspect 40: A composite made by the method of any of aspects 37 to 39.

Aspect 41: A binder composition, comprising: 5 to 65 weight percent of a liquid reactive diluent comprising an anhydride that is partially or fully esterified with a monohydric $C_{1-6}$ alcohol, a hydroxy-functionalized vinyl ester, a fatty acid ester of an epoxidized oil, or a combination thereof, wherein the liquid reactive diluent has a number average molecular weight of 950 grams per mole or less, or 650 grams per mole or less; and 5 to 30 weight percent of a colorant, wherein weight percent is based on the total weight of the binder composition.

Aspect 42: A binder composition comprising: 4 to 40 weight percent of a reactive diluent comprising an anhydride that is esterified with a monohydric $C_{1-6}$ alcohol, a hydroxy-functionalized vinyl ester, a fatty acid ester of an epoxidized oil, or a combination thereof, wherein the liquid reactive diluent has a number average molecular weight of 950 grams per mole or less, or 650 grams per mole or less; 60 to 96 weight percent of an unsaturated polyester having an acid value of 5 to 150 in a vinyl reactive diluent; and optionally, 1 to 40 weight percent of a colorant; wherein weight percent of each component is based on the total weight of the binder composition.

Aspect 43: A cured product formed from the binder composition of aspect 42, wherein the binder composition is heated to a temperature of 20 to 160° C. in the presence of an initiator to form the cured product, preferably wherein the initiator is a radical initiator, preferably a peroxy initiator.

Aspect 44: A method of emulsion polymerization, the method comprising: polymerizing a reaction mixture comprising water, an emulsifier, an ethylenically unsaturated monomer, an initiator, and an esterification reaction product of a unsaturated anhydride with a $C_{1-8}$ alcohol and an epoxidized fatty acid methyl ester having a number average molecular weight of 950 grams per mole or less, or 650 grams per mole or less to provide a latex composition comprising a copolymer comprising repeating units derived from the ethylenically unsaturated monomer and the esterification reaction product.

Aspect 45: A binder composition comprising: 5 to 75 weight percent of an epoxidized vegetable oil or a derivative thereof having an epoxy group content of 1 to 12 weight percent, based on the total weight of the epoxidized vegetable oil, and wherein the epoxidized vegetable oil comprises a fatty acid ester comprising $C_{5-26}$ alkyl groups; and 0 to 65 weight percent of a carboxyl-functionalized resin having an acid value of greater than or equal to 50; and 5 to 75 weight percent of a liquid reactive diluent; and 0 to 5 weight percent of an initiator; wherein weight percent of each component is based on the total weight of the binder composition; wherein a combined acid value of the carboxyl-functionalized resin and the liquid reactive diluent is 50 to 500; wherein the carboxyl-functionalized resin comprises a carboxyl-acid functionalized polymer comprising an unsaturated polyester, an acrylic polymer, or a combination thereof; wherein the liquid reactive diluent comprises at least one of: a hydroxyl-functionalized $C_{1-12}$ alkyl (meth) acrylate, a vinyl monomer, an allyl monomer, a ($C_{1-8}$ hydrocarbyl) hydrogen maleate, a bis($C_{1-8}$ hydrocarbyl) maleate, an adduct of an anhydride and an epoxidized fatty acid methyl ester, an anhydride that is at least partially esterified with a $C_{1-8}$ alcohol, a hydroxy-functionalized vinyl ester, dicyclopentadiene, an alkyl glycidyl ether, a fatty acid ester of an epoxidized oil, a transesterification reaction product of an epoxidized fatty acid methyl ester and a vinyl compound having pendant hydroxyl groups, said transesterification product having a number average molecular weight of 650 grams per mole or less, or a combination thereof.

Aspect 46: The binder composition of aspect 45, wherein the carboxyl-functionalized resin comprises an unsaturated polyester having a number average molecular weight of 220 to 5,000 Daltons and a glass transition temperature of 10 to 90° C.

Aspect 47: The binder composition of aspect 45 or 46, wherein the carboxyl-functionalized resin is dissolved or homogenously dispersed in the liquid reactive diluent at 25° C.

Aspect 48: The binder composition of any of aspects 45 to 47, wherein the carboxyl-functionalized resin comprises the acrylic polymer, and wherein the acrylic polymer has a number average molecular weight of 500 to 25,000 grams per mole and a Tg of 10 to 90° C., and wherein the acrylic polymer comprises pendant anhydride groups.

Aspect 49: The binder composition of any of aspects 45 to 48, wherein the liquid reactive diluent is the anhydride that is at least partially esterified with a $C_{1-8}$ alcohol, a hydroxy-functionalized vinyl ester, dicyclopentadiene, an alkyl glycidyl ether, or a fatty acid ester of an epoxidized oil; optionally wherein the liquid reactive diluent has a number average molecular weight of 950 grams per mole or less, or 650 grams per mole or less.

Aspect 50: The binder composition of any of aspects 45 to 49, further comprising an oligomer formed from reaction of an isocyanate or isocyanate-terminated prepolymer with a vinyl compound having pendent hydroxyl groups, wherein the oligomer is provided to the composition in the form of a concentrate comprising 60 to 95 weight percent of the liquid reactive diluent and 5 to 40 weight percent of the oligomer.

Aspect 51: The binder composition of any of aspects 45 to 50, wherein the liquid reactive diluent comprises a mono-, di-, or poly-functional acrylate ester or a vinyl monomer.

Aspect 52: The binder composition of any of aspects 45 to 51, wherein a stoichiometric ratio of epoxy groups to carboxyl groups is 0.85:1 to 1.5:1.

Aspect 53: The binder composition of any of aspects 45 to 52, wherein the epoxidized vegetable oil is a derivative further comprising polymerizable ethylenic unsaturation.

Aspect 54: The binder composition of any of aspects 45 to 53, further comprising a colorant, wherein the colorant and the liquid reactive diluent are provided to the composition in the form of a concentrate comprising 30 to 95 weight percent of the liquid reactive diluent and 5 to 70 weight percent of the colorant, based on the total weight of the concentrate.

Aspect 55: A method for the manufacture of the binder composition of any of aspects 45 to 54, the method comprising combining the components of the composition, and optionally reacting the components of the composition to provide a reaction product.

Aspect 56: The method of aspect 55, wherein combining the components of the composition comprises: providing a concentrate comprising: 30 to 95 weight percent of the liquid reactive diluent; and 5 to 70 weight percent of a colorant; wherein weight percent is based on the total weight of the concentrate; and combining the concentrate with the epoxidized vegetable oil or a derivative thereof and, optionally, the carboxyl-functionalized resin to provide the binder composition.

Aspect 57: A composition comprising a cured product derived from the binder composition of any of aspects 45 to 54.

Aspect 58: A composite comprising: 1 to 80 weight percent of a cured product derived from the binder composition of any of aspects 45 to 54; 20 to 99 weight percent of a reinforcing agent comprising a mineral filler or a fibrous material; and optionally, an additive composition; wherein weight percent is based on the total weight of the composite.

Aspect 59: A method of preparing a composite, the method comprising curing the binder composition of any of aspects 45 to 54 in the presence of a reinforcing agent to provide the composite, wherein curing the binder composition comprises heating the binder composition to a temperature of 10 to 250° C., optionally in the presence of a catalyst, a silane coupling agent, or both.

Aspect 60: The method of aspect 59, wherein the binder composition is preheated to a temperature of 20 to 75° C. prior to the curing in the presence of the reinforcing agent.

Aspect 61: The binder composition of any of aspects 45 to 54, wherein the epoxidized vegetable oil or derivative thereof is a fatty acid ester of an epoxidized oil; and the liquid reactive diluent comprises the anhydride that is at least partially esterified with a $C_{1-8}$ alcohol, a hydroxy-functionalized vinyl ester, dicyclopentadiene, an alkyl glycidyl ether, or a combination thereof; and wherein the binder composition is a reaction product of the epoxidized vegetable oil or derivative thereof and the liquid reactive diluent to provide the binder composition in the form of an adduct.

Aspect 62: The binder composition of aspect 61, further comprising: a vinyl ester resin or an unsaturated polyester resin with an acid value of 5 to 250; a vinyl monomer; and an initiator.

Aspect 63: The binder composition of claim 62, comprising 4 to 70 weight percent of the adduct; 20 to 94 weight percent of the unsaturated polyester or the vinyl ester resin; 2 to 45 weight percent of the vinyl monomer; and optionally, 1 to 40 weight percent of a colorant; wherein weight percent of each component is based on the total weight of the binder composition.

Aspect 64: A cured product formed from the composition of aspect 63, wherein the composition is heated to a temperature of 10 to 160° C. in the presence of an initiator to form the cured product.

Aspect 65: The binder composition of aspect 61, further comprising a vinyl monomer, an unsaturated anhydride, or a combination thereof, wherein the adduct is further formed in the presence of an initiator to form a polymeric product.

Aspect 66: An asphalt composition comprising: the binder composition of aspect 65; a styrene-butadiene-styrene block copolymer; bitumen; and an additive.

Aspect 67: A composition comprising a reaction product derived from reaction of the binder composition of aspect 61; and a polyisocyanante, a polyisocyanate prepolymer, or a combination thereof; optionally, in the presence of a polyol, for example castor oil, an initiator, or a combination thereof.

Aspect 68: A binder composition comprising: a first component comprising: an adduct of an anhydride and an epoxidized fatty acid methyl ester; an anhydride that is at least partially esterified with a $C_{1-8}$ alcohol, a hydroxy-functionalized vinyl ester, dicyclopentadiene, a $(C_{1-12})$ alkyl glycidyl ether, a fatty acid ester of an epoxidized oil having 1 to 12% by weight of epoxy groups or its precursor, the epoxidized oil; a transesterification reaction product of an epoxidized fatty acid methyl ester and a vinyl-containing compound having pendant hydroxyl groups, said transesterification product having a number average molecular weight of 650 grams per mole or less; or a combination thereof; wherein a combined acid value of the first component is 2 to 475; and a second component comprising a hydroxyl-functionalized $C_{1-12}$ alkyl (meth)acrylate, a vinyl monomer, an allyl monomer, an unsaturated anhydride, or a combination thereof.

Aspect 69: The binder composition of aspect 68, wherein the first component comprises: an anhydride that is at least partially esterified with a $C_{1-8}$ alcohol, the hydroxy-functionalized vinyl ester, dicyclopentadiene, a $(C_{1-12})$ alkyl glycidyl ether, or a combination thereof and is further esterified with the fatty acid ester of an epoxidized oil.

Aspect 70: The binder composition of aspect 68 and 69 further comprising a third component comprising a vinyl ester resin or an unsaturated polyester resin having an acid value of 2 to 350.

Aspect 71: The binder composition of any of aspects 68 to 71, further comprising an initiator.

Aspect 72: The binder composition of any of any of aspects 70 or 71, comprising: 2 to 70 weight percent of the first component; 0 to 50 weight percent of the second component; and 25 to 95 weight percent of the third component; wherein weight percent is based on the total weight of the binder composition.

Aspect 73: The binder composition of any of claims 70 to 71, wherein the second component comprises a vinyl monomer, and the composition comprises: 4 to 70 weight percent of the first component; 2 to 45 weight percent of the second component; 20 to 94 weight percent of the third component; and optionally, 1 to 40 weight percent of a colorant; wherein weight percent is based on the total weight of the binder composition.

Aspect 74: The binder composition of aspects 68 or 69, consisting of the first component, the second component, and a fourth component, wherein the fourth component is: an epoxidized oil or its derivative having epoxy group content of 1 to 12%; and wherein the first component is present in an amount of 5 to 95 weight percent; the second component is present in an amount of 0 to 40 weight percent; and the fourth component is present in an amount of 0 to 75 weight percent; wherein weight percent is based on the total weight of the binder composition.

Aspect 75: The binder composition of any of aspects 68 to 74, wherein the second component is a mono-, di-, or poly-functional acrylate ester or a vinyl monomer.

Aspect 76: The binder composition of any of aspects 68 to 75, wherein the average molecular weight of the first component is less than 1100 Daltons.

Aspect 77: The binder composition of any of aspects 68 to 76, further comprising an oligomer formed from reaction of an isocyanate or isocyanate-terminated prepolymer with a vinyl compound having pendent hydroxyl groups, wherein the oligomer is provided to the composition in the form of a concentrate comprising 60 to 95 weight percent of the first component and 5 to 40 weight percent of the oligomer.

Aspect 78: The binder composition of any of aspects 68 to 77, further comprising a colorant, wherein the colorant and the first component are provided to the composition in the form of a concentrate comprising 30 to 95 weight percent of the first component and 5 to 70 weight percent of the colorant, based on the total weight of the concentrate.

Aspect 79: The binder composition of aspect 68, wherein the first component comprises: the anhydride that is at least partially esterified with a fatty acid ester of an epoxidized oil having 1 to 12% by weight of epoxy groups or its precursor, the epoxidized oil, and a $C_{1-8}$ alcohol, a hydroxy-functionalized vinyl ester, dicyclopentadiene, or a combination thereof; the second component comprises the vinyl monomer, the unsaturated anhydride, or a combination thereof; and wherein the binder composition comprises a polymeric product formed from reaction of the first component and the second component in the presence of an initiator.

Aspect 80: A method for the manufacture of the binder composition of any of aspects 68 to 79, the method comprising combining the components of the composition, and optionally reacting the components of the composition to provide a reaction product.

Aspect 81: The method of aspect 80, wherein combining the components of the binder composition comprises: providing a concentrate comprising: 30 to 95 weight percent of the first component; and 0 to 20 weight percent of the second component; and 5 to 70 weight percent of a colorant; wherein weight percent is based on the total weight of the concentrate.

Aspect 82: A composition comprising a cured product derived from the binder composition of any of aspects 68 to 79.

Aspect 83: A composite comprising: 1 to 80 weight percent of a cured product derived from the binder composition of any of aspects 68 to 79; 20 to 99 weight percent of a reinforcing agent comprising a mineral filler or a fibrous material; and optionally, an additive composition; wherein weight percent is based on the total weight of the composite.

Aspect 84: A method of preparing a composite, the method comprising curing the binder composition of any of aspects 68 to 79 in the presence of a reinforcing agent to provide the composite, wherein curing the binder composition comprises heating the binder composition to a temperature of 10 to 250° C., optionally in the presence of a catalyst, a silane coupling agent, or both.

Aspect 85: The method of aspect 84, wherein the binder composition is preheated to a temperature of 20 to 75° C. prior to the curing in the presence of the reinforcing agent.

Aspect 86: A cured product formed from the binder composition of aspect 69, wherein the cured product is formed by heating the binder composition to a temperature of 10 to 160° C. in the presence of an initiator to form the cured product.

Aspect 87: An asphalt composition comprising: the binder composition of aspect 68, wherein the binder composition comprises a polymeric product formed by reaction of the first component and the second component; a styrene-butadiene-styrene block copolymer, bitumen; and an additive.

Aspect 88: A composition comprising the binder composition of aspect 69; and a polyisocyanate, a polyisocyanate prepolymer, or a combination thereof; optionally, in the presence of a polyol, a vinyl compound with pendant hydroxyl groups, an initiator, or a combination thereof.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects. It will be understood that the weight percentages of various components of the compositions described herein sum to 100 weight percent.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl.

Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-8}$ cycloalkenyl, $C_{6-12}$ aryl, $C_{7-13}$ arylalkylene (e.g., benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the compound or group, including those of any substituents.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A binder composition comprising:
   5 to 75 weight percent of an epoxidized vegetable oil or a derivative thereof having an epoxy group content of 1 to 12 weight percent, based on the total weight of the epoxidized vegetable oil, and wherein the epoxidized vegetable oil comprises a fatty acid ester comprising $C_{5-26}$ alkyl groups;
   5 to 75 weight percent of a liquid reactive diluent; and
   0 to 5 weight percent of an initiator;
   wherein weight percent of each component is based on the total weight of the binder composition;
   wherein the liquid reactive diluent has a total acid value of 50 to 432 and comprises at least one of:
   a ($C_{1-8}$ hydrocarbyl) hydrogen maleate,
   a bis($C_{1-8}$ hydrocarbyl) maleate,
   an adduct of an anhydride and an epoxidized fatty acid methyl ester,
   an anhydride that is at least partially esterified with a $C_{1-8}$ alcohol, a hydroxy-functionalized vinyl ester, dicyclopentadiene, an alkyl glycidyl ether, a fatty acid ester of an epoxidized oil or a combination thereof, or
   a transesterification reaction product of an epoxidized fatty acid methyl ester and a vinyl compound having pendant hydroxyl groups, said transesterification product having a number average molecular weight of 650 grams per mole or less,
   or a combination thereof; and
   optionally wherein the composition further comprises up to 40 weight percent a vinyl monomer, a hydroxyl-functionalized $C_{1-12}$ alkyl (meth)acrylate, or a combination thereof.

2. The binder composition of claim 1, wherein the binder composition further comprises greater than 0 to 65 weight percent of a carboxyl-functionalized resin having an acid value of greater than or equal to 50,
   wherein the carboxyl-functionalized resin comprises a polyester having a number average molecular weight of 220 to 5,000 Daltons and a glass transition temperature of 10 to 90° C., or
   an acrylic polymer, and wherein the acrylic polymer has a number average molecular weight of 500 to 25,000 grams per mole and a Tg of 10 to 90° C., and wherein the acrylic polymer comprises pendant anhydride groups,
   wherein a combined acid value of the carboxyl-functionalized resin and the liquid reactive diluent is 50 to 500.

3. The binder composition of claim 2, wherein the carboxyl-functionalized resin is dissolved or homogenously dispersed in the liquid reactive diluent at 25° C.

4. The binder composition of claim 2, wherein the carboxyl-functionalized resin comprises the acrylic polymer, and wherein the composition further comprises the hydroxyl-functionalized $C_{1-12}$ alkyl (meth)acrylate.

5. The binder composition of claim 1, wherein the liquid reactive diluent is the anhydride that is at least partially esterified with a $C_{1-8}$ alcohol, a hydroxy-functionalized vinyl ester, dicyclopentadiene, an alkyl glycidyl ether, a fatty acid ester of an epoxidized oil, or a combination thereof;
optionally wherein the liquid reactive diluent has a number average molecular weight of 950 grams per mole or less.

6. The binder composition of claim 1, further comprising an oligomer formed from reaction of an isocyanate or isocyanate-terminated prepolymer with a vinyl compound having pendent hydroxyl groups, wherein the oligomer is provided to the composition in the form of a concentrate comprising 60 to 95 weight percent of the liquid reactive diluent and 5 to 40 weight percent of the oligomer.

7. The binder composition of claim 1, further comprising the vinyl monomer, wherein the vinyl monomer comprises a mono-, di-, or poly-functional acrylate ester.

8. The binder composition of claim 1, wherein a stoichiometric ratio of epoxy groups to carboxyl groups is 0.85:1 to 1.5:1.

9. The binder composition of claim 1, wherein the epoxidized vegetable oil is a derivative further comprising polymerizable ethylenic unsaturation.

10. The binder composition of claim 1, further comprising a colorant, wherein the colorant and the liquid reactive diluent are provided to the composition in the form of a concentrate comprising 30 to 95 weight percent of the liquid reactive diluent and 5 to 70 weight percent of the colorant, based on the total weight of the concentrate.

11. The binder composition of claim 1, wherein the derivative of the epoxidized vegetable oil is an adduct of an epoxidized fatty acid alkyl ester and an anhydride that is at least partially esterified with a $C_{1-8}$ alcohol, a hydroxy-functionalized vinyl ester, dicyclopentadiene, or a combination thereof.

12. The binder composition of claim 11, further comprising:
a vinyl ester resin or an unsaturated polyester resin with an acid value of 5 to 250;
a vinyl monomer; and
an initiator;
wherein a combined acid value of the polyester resin and the liquid reactive diluent is 50 to 500.

13. The binder composition of claim 12, comprising
4 to 70 weight percent of the adduct;
20 to 94 weight percent of the unsaturated polyester or the vinyl ester resin;
2 to 45 weight percent of the vinyl monomer; and
optionally, 1 to 40 weight percent of a colorant;
wherein weight percent of each component is based on the total weight of the binder composition.

14. The binder composition of claim 11, further comprising a vinyl monomer, an unsaturated anhydride, or a combination thereof,
wherein the adduct is further reacted in the presence of an initiator and optionally, in the presence of an inert liquid medium and or an emulsifying surfactant to form a polymeric product.

15. A method for the manufacture of the binder composition of claim 10, the method comprising
combining the concentrate with the remaining components of the composition.

16. A method for the manufacture of the binder composition of claim 1, the method comprising combining the components of the composition, and optionally reacting the components of the composition to provide a reaction product.

17. A cured product formed from the composition of claim 13, wherein the composition is heated to a temperature of 10 to 160° C. in the presence of an initiator to form the cured product.

18. An asphalt composition comprising:
the binder composition comprising the polymeric product of claim 14;
a styrene-butadiene-styrene block copolymer,
bitumen; and
an additive.

19. A composition comprising a reaction product derived from reaction of
the binder composition of claim 11; and
a polyisocyanate, a polyisocyanate prepolymer, or a combination thereof;
optionally, in the presence of a polyol, a vinyl compound with pendant hydroxyl groups, an initiator, or a combination thereof.

20. A composition comprising a cured product derived from the binder composition of claim 1.

21. A composite comprising:
1 to 80 weight percent of a cured product derived from the binder composition of claim 1;
20 to 99 weight percent of a reinforcing agent comprising a mineral filler or a fibrous material; and
optionally, an additive composition;
wherein weight percent is based on the total weight of the composite.

22. A method of preparing a composite, the method comprising curing the binder composition of claim 1 in the presence of a reinforcing agent to provide the composite, wherein curing the binder composition comprises heating the binder composition to a temperature of 10 to 250° C., optionally in the presence of a catalyst, a silane coupling agent, or both.

23. The method of claim 22, wherein the binder composition is preheated to a temperature of 20 to 75° C. prior to the curing in the presence of the reinforcing agent.

* * * * *